United States Patent
Yamada et al.

(10) Patent No.: US 9,727,993 B2
(45) Date of Patent: Aug. 8, 2017

(54) IMAGE PROCESSING APPARATUS, IMAGE PROCESSING METHOD, AND PROGRAM

(71) Applicant: Sony Corporation, Tokyo (JP)

(72) Inventors: Hideshi Yamada, Kanagawa (JP); Shinichi Yoshimura, Tokyo (JP); Mitsuharu Ohki, Tokyo (JP); Shuichi Konami, Chiba (JP); Masayuki Tachi, Tokyo (JP); Hirotaka Shinozaki, Tokyo (JP); Mayuko Maruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/762,250

(22) PCT Filed: Feb. 14, 2014

(86) PCT No.: PCT/JP2014/053481
§ 371 (c)(1),
(2) Date: Jul. 21, 2015

(87) PCT Pub. No.: WO2014/132816
PCT Pub. Date: Sep. 4, 2014

(65) Prior Publication Data
US 2015/0348301 A1    Dec. 3, 2015

(30) Foreign Application Priority Data

Feb. 27, 2013   (JP) ................. 2013-037867

(51) Int. Cl.
*G06T 11/60* (2006.01)
*G06K 9/00* (2006.01)
(Continued)

(52) U.S. Cl.
CPC .............. *G06T 11/60* (2013.01); *G06F 3/013* (2013.01); *G06K 9/00288* (2013.01);
(Continued)

(58) Field of Classification Search
CPC  G06T 11/60; G06K 9/00288; G06K 9/00308; H04N 5/23219; H04N 5/23229;
(Continued)

(56) References Cited

U.S. PATENT DOCUMENTS 7,440,013 B2 * 10/2008 Funakura ........... H04N 5/23219
348/239
2005/0036044 A1   2/2005 Funakura
(Continued)

FOREIGN PATENT DOCUMENTS

EP       1 560 421 A1    8/2005
JP    2005-094741 A    4/2005
(Continued)

OTHER PUBLICATIONS

International Search Report; International Application No. PCT/JP2014/053481; Filed: Feb. 14, 2014. (Form PCT/ISA/210).
(Continued)

*Primary Examiner* — Gevell Selby
(74) *Attorney, Agent, or Firm* — Michael Best & Friedrick LLP

(57) ABSTRACT

An in-image capturing unit captures an image of a subject in a direction facing a front surface of an image processing apparatus, as an in-image, and an out-image capturing unit captures an image of a subject in a direction facing a back surface of the image processing apparatus, as an out-image. A signal processing unit obtains a binary image as additional information, the binary image being obtained by binarizing the in-image, for example, and adds the additional information to image data of the out-image. Additionally, the signal processing unit combines the binary image serving as the additional information with the out-image when the out-image is reproduced, and displays the resultant image. In such a manner, information obtained from the in-image is
(Continued)

added to the out-image as additional information, and thus it is possible to more effectively display an image and improve convenience.

18 Claims, 33 Drawing Sheets

(51) Int. Cl.
*H04N 5/91* (2006.01)
*G06F 3/01* (2006.01)
*H04N 5/225* (2006.01)
*H04N 5/232* (2006.01)

(52) U.S. Cl.
CPC ....... *G06K 9/00308* (2013.01); *H04N 5/2258* (2013.01); *H04N 5/23219* (2013.01); *H04N 5/23229* (2013.01); *H04N 5/23293* (2013.01); *H04N 5/91* (2013.01)

(58) Field of Classification Search
CPC .... H04N 5/2258; H04N 5/23293; H04N 5/91; G06F 3/013
See application file for complete search history.

(56) References Cited

U.S. PATENT DOCUMENTS

| | | |
|---|---|---|
| 2006/0033820 A1 | 2/2006 | Honda et al. |
| 2010/0053364 A1* | 3/2010 | Mino .................. H04N 5/23212 348/222.1 |
| 2012/0179960 A1 | 7/2012 | Cok et al. |
| 2012/0218431 A1* | 8/2012 | Matsuoto ............. H04N 5/2258 348/218.1 |

FOREIGN PATENT DOCUMENTS

| | | |
|---|---|---|
| JP | 2006-033611 A | 2/2006 |
| JP | 2007-110262 A | 4/2007 |
| JP | 2010-003201 A | 1/2010 |
| JP | 2010-062853 A | 3/2010 |
| JP | 2011-250340 A | 12/2011 |

OTHER PUBLICATIONS

PCT Written Opinion of the International Searching Authority; International Application No. PCT/JP2014/053481; Date of Opinion: Mar. 11, 2014. (Form PCT/ISA/220 and PCT/ISA/237).

European Patent Office Communication Pursuant to Rule 164(1) EPC issued Aug. 5, 2016 for corresponding European Application No. 14757727.4.

Extended European Search Report issued Nov. 9, 2016 for corresponding European Application No. EP 14757727.4.

\* cited by examiner

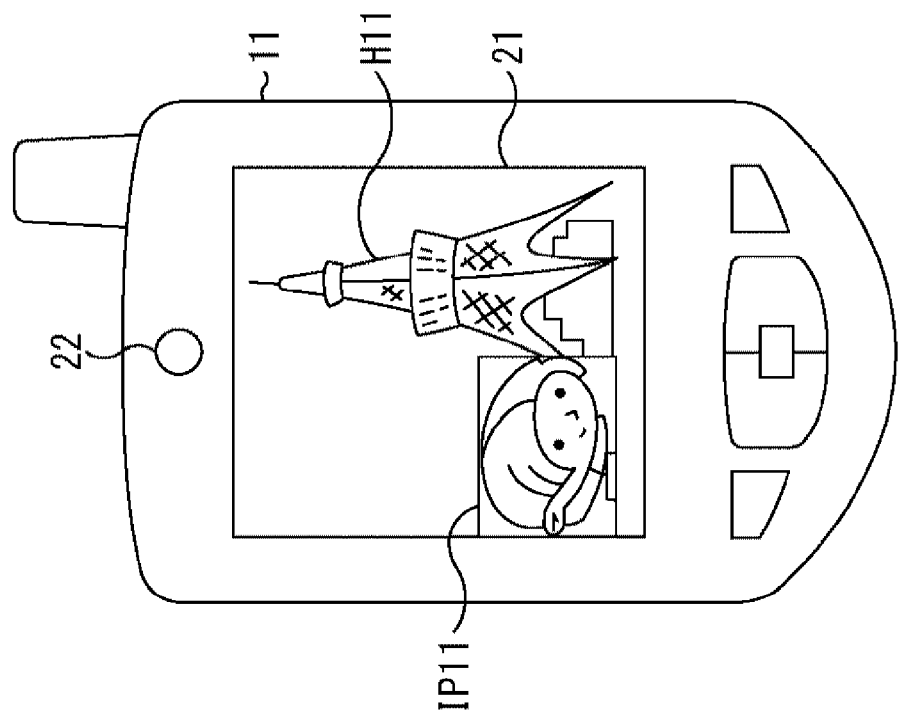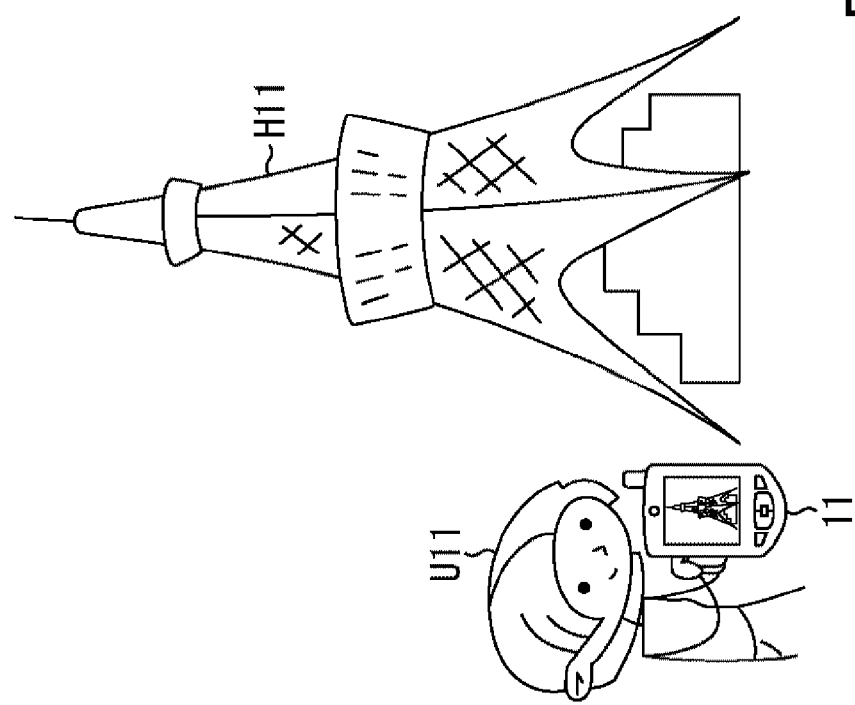
FIG.2

IMAGE PROCESSING APPARATUS, IMAGE PROCESSING METHOD, AND PROGRAM

TECHNICAL FIELD

The present technology relates to an image processing apparatus, an image processing method, and a program, and particularly to an image processing apparatus, an image processing method, and a program that are capable of displaying an image more effectively and also improving convenience.

BACKGROUND ART

Heretofore, there have been known imaging apparatuses each equipped with two cameras. Some of such imaging apparatuses can simultaneously capture images with the two cameras.

Examples of such imaging apparatuses include an imaging apparatus that captures images with a main camera and a sub-camera, and when acquiring voice of a photographer by a sub-microphone, combines an image obtained by the sub-camera with an image obtained by the main camera, for recording (see, for example, Patent Document 1).

Patent Document 1: Japanese Patent Application Laid-open No. 2011-250340

SUMMARY OF INVENTION

Problem to be Solved by the Invention

In the technology described above, however, after the image obtained by the sub-camera is combined with the image obtained by the main camera, this makes it impossible to display only an image obtained by the main camera and not subjected to image composition. As a result, captured images cannot be displayed fully effectively.

Additionally, when switching on whether to perform image composition or not is intended to be performed, instructions should be given by utterance or the like each time an image is captured, which is burdensome. As a result, a photographer cannot concentrate on capturing images in some cases.

The present technology has been made in view of such circumstances and makes it possible to display an image more effectively and also improve convenience.

Means for Solving the Problem

According to one aspect of the present technology, there is provided an image processing apparatus, including: a first imaging unit that images a first direction; a second imaging unit that images a second direction, the second direction being different from the first direction; an additional-information generating unit that generates additional information based on a first image, the first image being obtained in imaging by the first imaging unit; and an additional processing unit that adds the additional information to image data of a second image, the second image being obtained in imaging by the second imaging unit.

The additional-information generating unit may compress an information amount of the first image, to generate the additional information.

The additional-information generating unit may compress the size of the first image, to generate the additional information.

The first imaging unit may image a direction of a user operating the image processing apparatus, the direction serving as the first direction, and the image processing apparatus may further include a combining unit that combines an image obtained from the additional information with the second image.

The first imaging unit may image a direction of a user operating the image processing apparatus, the direction serving as the first direction, and the additional-information generating unit may perform face recognition processing on the first image, to generate photographer information of the second image as the additional information.

The image processing apparatus may further include: an extraction unit that detects a second image from the plurality of second images based on the additional information, the second image being captured by a specific photographer; and a reproduction unit that displays only the second image detected by the extraction unit.

The image processing apparatus may further include a classification unit that records the second image in a recording area determined by the photographer information, the photographer information serving as the additional information.

The image processing apparatus may further include a display unit that is provided to a surface facing a user operating the image processing apparatus, the first imaging unit being provided to the surface, and displays an image taken in by the second imaging unit at a time when the second image is captured, in which the additional-information generating unit detects a line-of-sight direction of the user based on the first image, to generate information indicating a gaze area at which the user gazes on the second image, the information serving as the additional information.

The image processing apparatus may further include a reproduction unit that controls display of the second image based on the additional information.

The reproduction unit may superimpose and display the plurality of second images based on the additional information.

The image processing apparatus may further include a viewing-angle converting unit that performs viewing-angle conversion processing on the second image, in which the additional-information generating unit may obtain, as the additional information, a cropped image obtained by cutting out an area including a main subject on the first image, and the additional processing unit may add the additional information to the image data of the second image on which the viewing-angle conversion processing is performed.

The image processing apparatus may further include a combining unit that arranges and combines the cropped image serving as the additional information with the second image on which the viewing-angle conversion processing is performed, to generate a composite image with an aspect ratio that is the same as an aspect ratio of the second image captured by the second imaging unit.

The first imaging unit may image a direction of a user operating the image processing apparatus, the direction serving as the first direction, the additional-information generating unit may detect a smile of the user based on the first image and generate the degree of smile of the user as the additional information, and the second imaging unit may image the second direction when the smile of the user is detected.

The image processing apparatus may further include a classification unit that records the second image in a recording area determined by the degree of smile, the degree of smile serving as the additional information.

The first imaging unit may image a direction of a user operating the image processing apparatus, the direction serving as the first direction, the additional-information generating unit may detect a smile of the user based on the first image and generate the degree of smile of the user as the additional information, and the image processing apparatus may further include a classification unit that records the second image in a recording area determined by the degree of smile, the degree of smile serving as the additional information.

According to one aspect of the present technology, there is provided an image processing method or a program, including: imaging, by a first imaging unit, a first direction; imaging, by a second imaging unit, a second direction that is different from the first direction; generating additional information based on a first image that is obtained in imaging by the first imaging unit; and adding the additional information to image data of a second image that is obtained in imaging by the second imaging unit.

In one aspect of the present technology, a first direction is imaged by a first imaging unit, a second direction that is different from the first direction is imaged by a second imaging unit, additional information is generated based on a first image that is obtained in imaging by the first imaging unit, and the additional information is added to image data of a second image that is obtained in imaging by the second imaging unit.

Effect of the Invention

According to an aspect of the present technology, it is possible to display an image more effectively and also improve convenience.

BRIEF DESCRIPTION OF DRAWINGS

FIG. 2 is a diagram for describing display of an out-image.

MODE(S) FOR CARRYING OUT THE INVENTION

Hereinafter, embodiments to which the present technology is applied will be described with reference to the drawings.

First Embodiment

<Regarding the Overview of the Present Technology>

The present technology relates to a device including a plurality of imaging units that are capable of imaging mutually different directions, such as multi-function mobile phones and digital cameras. Such a device acquires information from an image captured simultaneously with another image when the other image is captured by a main imaging unit, to generate the information as additional information. In the present technology, such additional information is generated, and thus images can be displayed more effectively. Additionally, the additional information is embedded in image data, and thus display control with a higher degree of freedom can be performed at the time when images are reproduced, without requiring burdensome operations at the time when images are captured, and convenience can be improved.

Figure 1:
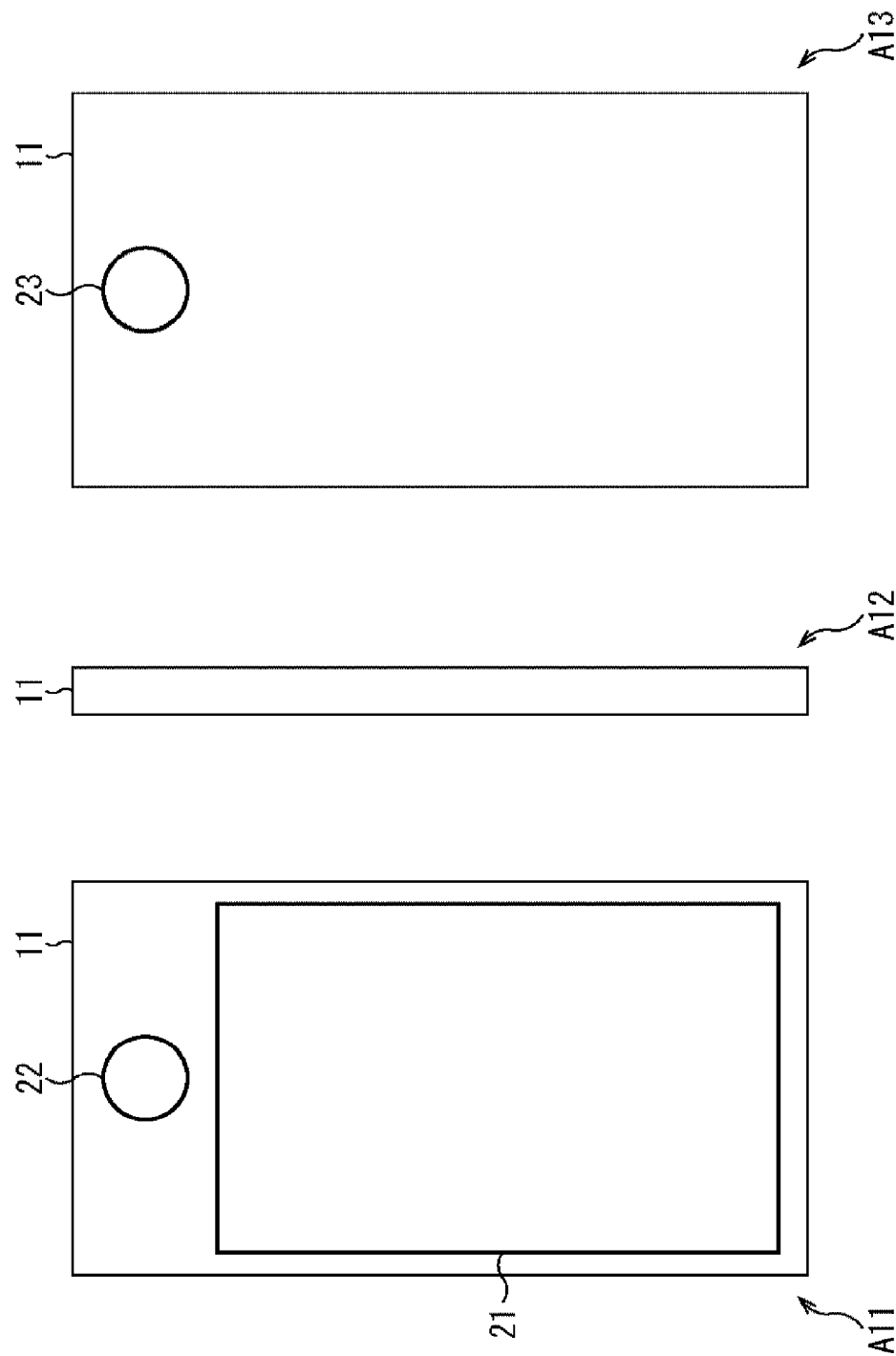
FIG. 1 is a diagram showing a configuration example of the outer appearance of an image processing apparatus.

FIG. 1 is a diagram showing a configuration example of the outer appearance of an image processing apparatus such as a multi-function mobile phone to which the present technology is applied.

In FIG. 1, an outer appearance of an image processing apparatus 11 indicated by an arrow A11 is an outer appearance on a front surface side, that is, on a side viewed from a user when the user holds and operates the image processing apparatus 11. Additionally, an outer appearance of the image processing apparatus 11 indicated by an arrow A12 is an outer appearance on a side surface side, that is, an outer appearance when the image processing apparatus 11 indicated by the arrow A11 is viewed from the left side or the right side of the drawing. Further, an outer appearance of the image processing apparatus 11 indicated by an arrow A13 is an outer appearance on a rear surface side, that is, on the opposite side to the front surface side.

As indicated by the arrow A11, a display unit 21 that displays an image or the like is provided on the front surface side of the image processing apparatus 11. A touch panel used for the user to perform an input operation is provided to be superimposed on the display unit 21. Additionally, in the drawing, an in-image capturing unit 22 is provided on the upper side of the display unit 21 on the front surface of the image processing apparatus 11. The in-image capturing unit 22 captures an image of a subject present in a direction of the front surface side of the image processing apparatus 11. Therefore, an image captured by the in-image capturing unit 22 is an image of the user operating the image processing apparatus 11 in most cases. Hereinafter, an image captured by the in-image capturing unit 22 is referred to as an in-image. The description will be continued assuming that an image of the user is captured as the in-image.

Further, as indicated by the arrow A13, an out-image capturing unit 23 is provided on the rear surface of the image processing apparatus 11. The out-image capturing unit 23 captures an image of a subject present in a direction of the rear surface side of the image processing apparatus 11. In this example, the out-image capturing unit 23 is provided to capture an image in the opposite direction to the imaging direction of the in-image capturing unit 22. However, the in-image capturing unit 22 and the out-image capturing unit 23 only need to be disposed such that imaging directions thereof are different from each other.

An image captured by the out-image capturing unit 23 is normally an image of a landscape, a human, or the like that the user is viewing, that is, an image of a subject that the user considers desirable to image. Hereinafter, an image captured by the out-image capturing unit 23 is referred to as an out-image.

In the case where the user captures an image of a desired subject with such an image processing apparatus 11, as shown in the left side of FIG. 2, for example, a user U11 directs the out-image capturing unit 23 of the image processing apparatus 11 toward a target subject H11 and gives an instruction to capture images. The image processing apparatus 11 then captures an in-image and an out-image simultaneously or almost simultaneously, according to the instruction to capture images by the user U11.

Therefore, in the image processing apparatus 11, an image of the subject H11 is obtained as the out-image, and an image of the user U11 is obtained as the in-image.

The image processing apparatus 11 performs processing such as encoding on the in-image thus obtained, as necessary, and obtains the resultant image as additional information. The image processing apparatus 11 then adds the obtained additional information to image data of the out-image.

Here, the additional information is not combined on the out-image, but is embedded as additional information in the image data of the out-image. Specifically, the additional information is embedded in the image data of the out-image conforming to, for example, Exif (Exchangeable image file format), as so-called Exif data, that is, as metadata on the out-image.

Additionally, at the time when the out-image is reproduced, the user can select whether to display only the out-image or whether to combine an image obtained from the additional information with the out-image for display. For example, in the case where the image obtained from the additional information is combined with the out-image for display, an out-image shown on the right side in the figure is displayed on the display unit 21.

In this example, an image IP11 obtained from the additional information is superimposed and displayed on the out-image in which the subject H11 appears.

Since the image IP11 is an image of the face of the user U11, a user viewing the out-image can know a person who has captured the out-image, a facial expression of the user U11 when capturing the out-image, that is, whether the user is smiling, angry, excited, or the like.

In such a way, the image obtained from the in-image is embedded in the image data of the out-image as additional information, and the additional information is used as necessary at the time when the out-image is reproduced. This makes it possible to check a situation of a photographer when capturing the out-image. Consequently, when out-images captured during a trip, for example, are viewed later, it is possible to enjoy more the out-images as memories.

Additionally, according to the image processing apparatus 11, since a situation where the out-image is captured can be checked in the image, for example, if an out-image is captured as reference information at the time when an accident is investigated, information on a photographer, an imaging environment, an imaging location, and the like can be easily saved.

(Configuration Example of Image Processing Apparatus)

Next, a more detailed configuration of the image processing apparatus 11 will be described.

Figure 3:
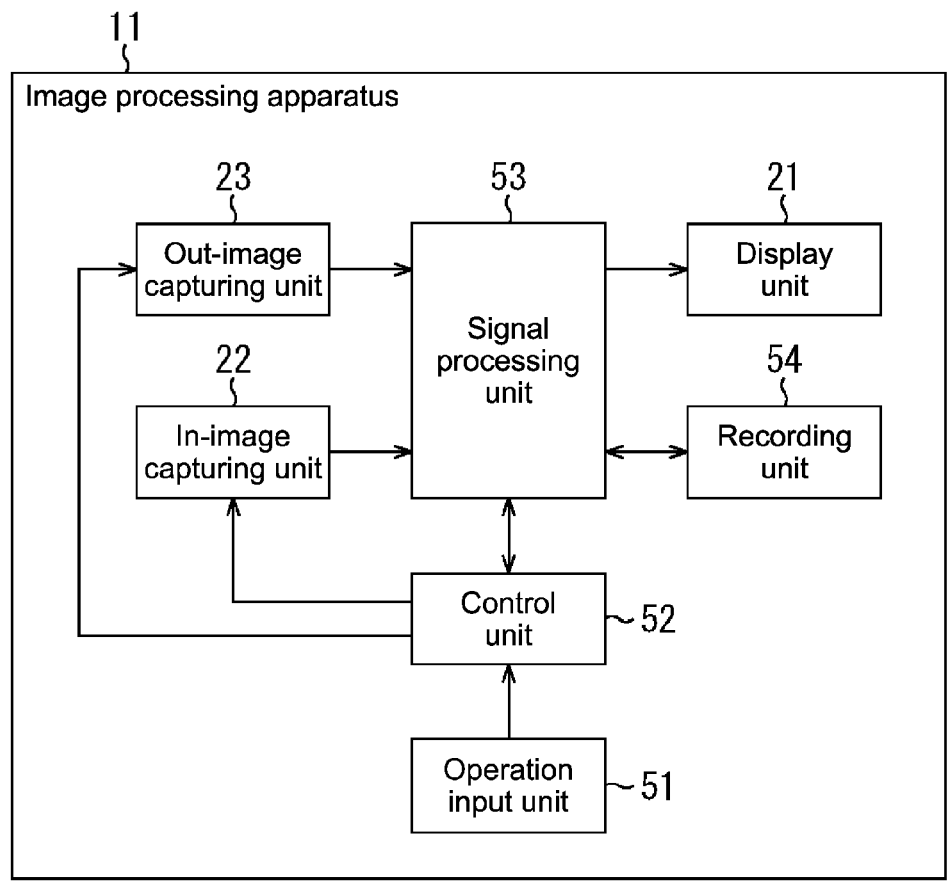
FIG. 3 is a diagram showing a configuration example of the image processing apparatus.

FIG. 3 is a block diagram showing a more detailed configuration example of the image processing apparatus 11. In FIG. 3, the same reference numerals are given to portions corresponding to the portions in FIG. 1 and description thereof will be appropriately omitted.

The image processing apparatus 11 shown in FIG. 3 includes the display unit 21, the in-image capturing unit 22, the out-image capturing unit 23, an operation input unit 51, a control unit 52, a signal processing unit 53, and a recording unit 54.

The operation input unit 51 is formed by, for example, a touch panel provided to be superimposed on the display unit 21 and supplies a signal corresponding to a user's operation to the control unit 52.

The control unit 52 controls the entire operation of the image processing apparatus 11 according to the signal supplied from the operation input unit 51. For example, the control unit 52 instructs the in-image capturing unit 22 or the out-image capturing unit 23 to capture an image or instructs the signal processing unit 53 to reproduce or record an out-image.

The signal processing unit 53 generates additional information based on an in-image supplied from the in-image capturing unit 22. The signal processing unit 53 adds the additional information to an out-image supplied from the out-image capturing unit 23 and also supplies the out-image, to which the additional information is added, to the recording unit 54, to record the out-image therein. Additionally, the signal processing unit 53 reads the out-image from the recording unit 54 and supplies the out-image to the display unit 21 for display.

The recording unit 54 records the out-image supplied from the signal processing unit 53 and also supplies the recorded out-image to the signal processing unit 53 as necessary.

<Configuration Example of Signal Processing Unit>

Figure 4:
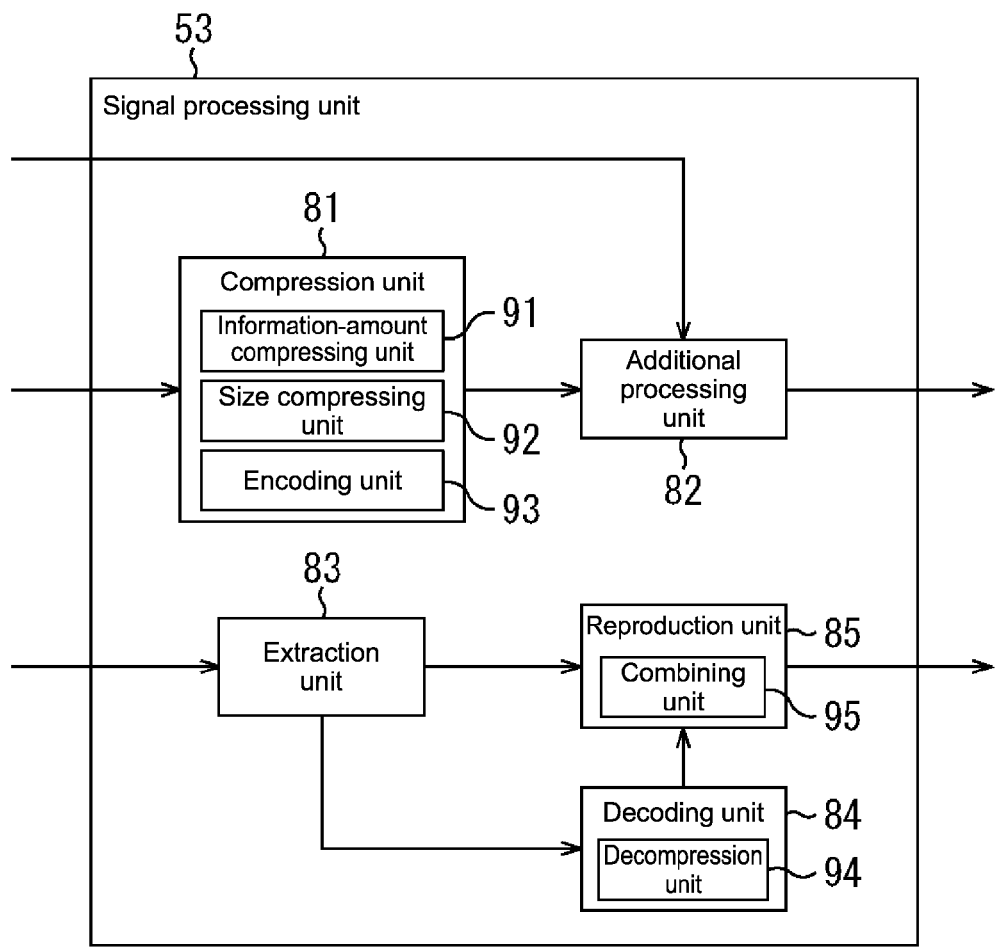
FIG. 4 is a diagram showing a configuration example of a signal processing unit.

The signal processing unit 53 of FIG. 3 is configured as shown in FIG. 4 in more detail.

The signal processing unit 53 shown in FIG. 4 includes a compression unit 81, an additional processing unit 82, an extraction unit 83, a decoding unit 84, and a reproduction unit 85.

The compression unit 81 compresses the amount or size of information on the in-image supplied from the in-image capturing unit 22 to generate additional information, and supplies the additional information to the additional processing unit 82. The compression unit 81 includes an information-amount compressing unit 91, a size compressing unit 92, and an encoding unit 93.

The information-amount compressing unit 91 binarizes the in-image, to extract the outline of a subject on the in-image. In other words, the in-image is converted into a binary image by binarization processing, and this leads to a compression of the information amount of the in-image.

The size compressing unit 92 reduces the size of the binary image obtained in the information-amount compressing unit 91, to compress the size of the binary image. The encoding unit 93 encodes the binary image having the size compressed by the compression unit 92, to obtain the binary image as additional information. It should be noted that the encoding processing by the encoding unit 93 can also be processing of compressing the information amount of the in-image (binary image).

The additional processing unit 82 adds the additional information, which is supplied from the compression unit 81, to the image data of the out-image supplied from the out-image capturing unit 23, and supplies the resultant out-image to the recording unit 54.

The extraction unit 83 reads the out-image from the recording unit 54 and extracts the additional information from the out-image. Additionally, the extraction unit 83 supplies the out-image to the reproduction unit 85 and also supplies the additional information, which is extracted from the out-image, to the decoding unit 84.

The decoding unit 84 decodes the additional information supplied from the extraction unit 83 and supplies the resultant binary image to the reproduction unit 85. Additionally, the decoding unit 84 includes a decompression unit 94. The decompression unit 94 decompresses the size of the binary image as necessary.

The reproduction unit 85 supplies the out-image, which is supplied from the extraction unit 83, to the display unit 21 for display. Additionally, the reproduction unit 85 includes a combining unit 95. The combining unit 95 combines the binary image supplied from the decoding unit 84 with the out-image. Therefore, the reproduction unit 85 can display the out-image, with which the binary image is combined as necessary, on the display unit 21.

<Description on Imaging Processing>

Incidentally, when the user performs operations with respect to the operation input unit 51 to select a mode in which additional information is added to an out-image and to give an instruction to capture an image of a desired subject, the image processing apparatus 11 starts imaging processing and records an out-image in which additional information embedded. Hereinafter, the imaging processing performed by the image processing apparatus 11 will be described with reference to the flowchart of FIG. 5.

In Step S11, the out-image capturing unit 23 captures an out-image according to an instruction of the control unit 52 and supplies the out-image to the additional processing unit 82. For example, a landscape image is captured as the out-image.

In Step S12, the in-image capturing unit 22 captures an in-image according to an instruction of the control unit 52 and supplies the in-image to the compression unit 81. For example, an image of the face of the user operating the image processing apparatus 11 is captured as the in-image.

In Step S13, the information-amount compressing unit 91 converts the in-image supplied from the in-image capturing unit 22 into a binary image. For example, the information-amount compressing unit 91 converts the in-image as a color image into a monochrome image in 256 gradation levels, and further binarizes the monochrome image to generate a binary image.

Consequently, for example, the image of the face of the user who captures the out-image is obtained as a binary image. Since this binary image is an image of the face of the user when the out-image is captured, a facial expression, a feeling, and the like of the user when the out-image is captured can be known from the image.

In Step S14, the size compressing unit 92 compresses the size of the binary image obtained in the information-amount compressing unit 91. For example, the binary image having the same size as the out-image is reduced to the size of 160×120 pixels, that is, to a thumbnail size of the image.

In Step S15, the encoding unit 93 encodes the binary image having the size compressed by the compression unit 92 and obtains the binary image as additional information.

Figure 6:
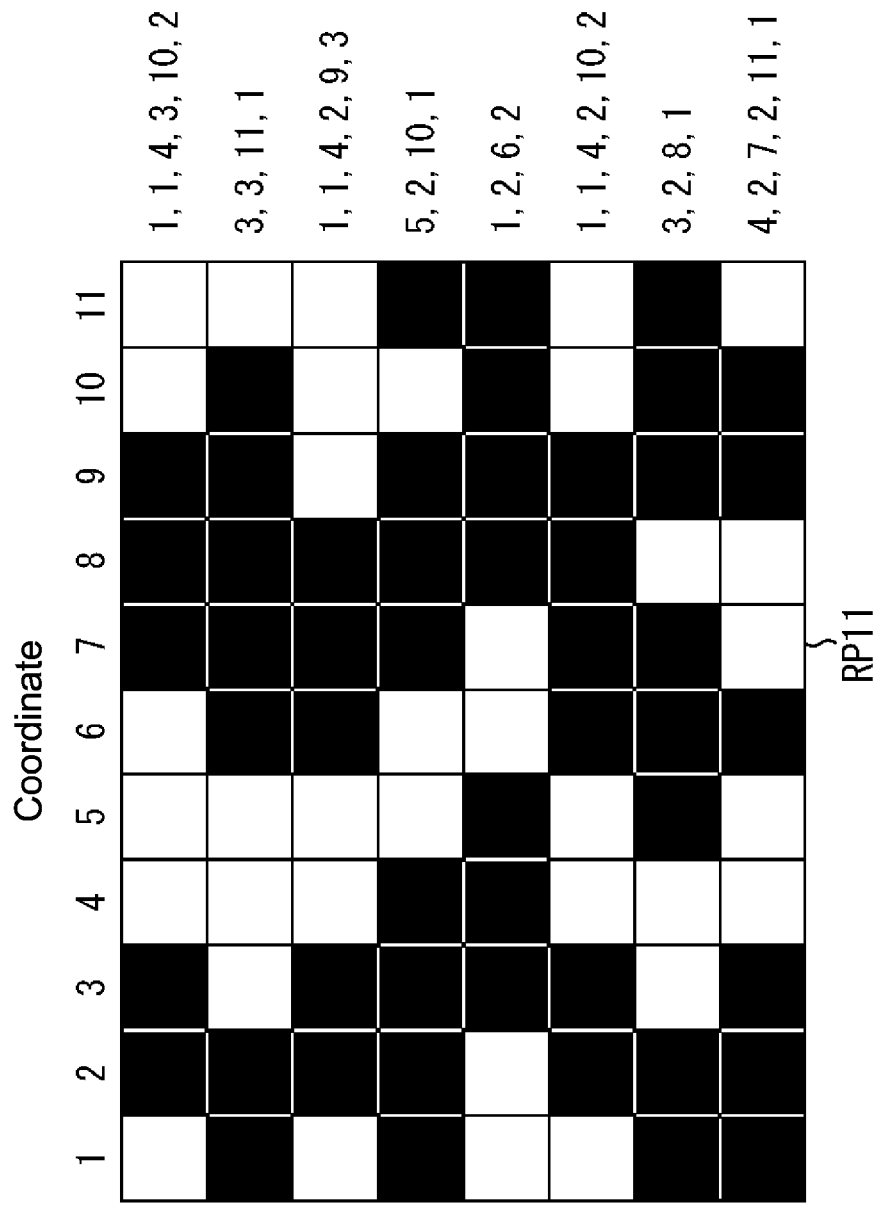
FIG. 6 is a diagram for describing a run length code.

For example, as shown in FIG. 6, the encoding unit 93 performs encoding on a binary image RP11 by run length encoding, and the resultant run length code is obtained as additional information.

It should be noted that each square of the binary image RP11 represents one pixel. In particular, a white square represents a pixel having a pixel value of "1", and a black square represents a square having a pixel value of "0".

Additionally, in FIG. 6, coordinates that indicate positions in a horizontal direction of the binary image RP11 in the figure are shown. For example, coordinates of pixels positioned at the left end of the binary image RP11 in the figure are represented as "1", and coordinates of pixels positioned at the right end in the figure are represented as "11". In other words, the coordinates of the respective pixels represent at which number those pixels are positioned from the left end of the binary image RP11.

In the case where the binary image RP11 is encoded by run length encoding, the binary image RP11 is encoded on a pixel-row basis, the pixel rows each having pixels arranged in the horizontal direction in the figure. In the encoding of the pixel rows, a pixel row to be encoded is expressed by a position of a starting point of the pixel row and a run length code. The pixel row is formed of pixels each having a pixel value of "1". The run length code is formed by a length of the pixel row.

Specifically, for example, assuming that the uppermost pixel row of the binary image RP11 in the figure is a pixel row of interest, in this pixel row of interest, a pixel at a coordinate of "1" has a pixel value of "1", and a pixel at a coordinate of "2" adjacent thereto has a pixel value of "0". Therefore, assuming that a pixel row having a starting point at a coordinate of "1" and including a pixel having a pixel value of "1" is expressed by "starting point, length" of the pixel row, "1,1" is obtained.

In the same manner, in the pixel row of interest, assuming that a pixel row having a starting point at a coordinate of "4" and including pixels each having a pixel value of "1" is expressed by "starting point, length", "4,3" is obtained. Further, in the pixel row of interest, assuming that a pixel row having a starting point at a coordinate of "10" and including pixels each having a pixel value of "1" is expressed by "starting point, length", "10,2" is obtained.

In this regard, as shown on the right side of the figure, the encoding unit 93 sets a code "1,1,4,3,10,2", which is obtained by arranging the codes indicating those three sets of "starting point, length", as a run length code of the pixel row of interest. The encoding unit 93 sets the run length code thus obtained for each pixel row of the binary image RP11 as additional information of the binary image RP11.

The compression unit 81 supplies the additional information obtained by encoding by the encoding unit 93 to the additional processing unit 82.

Figure 5:
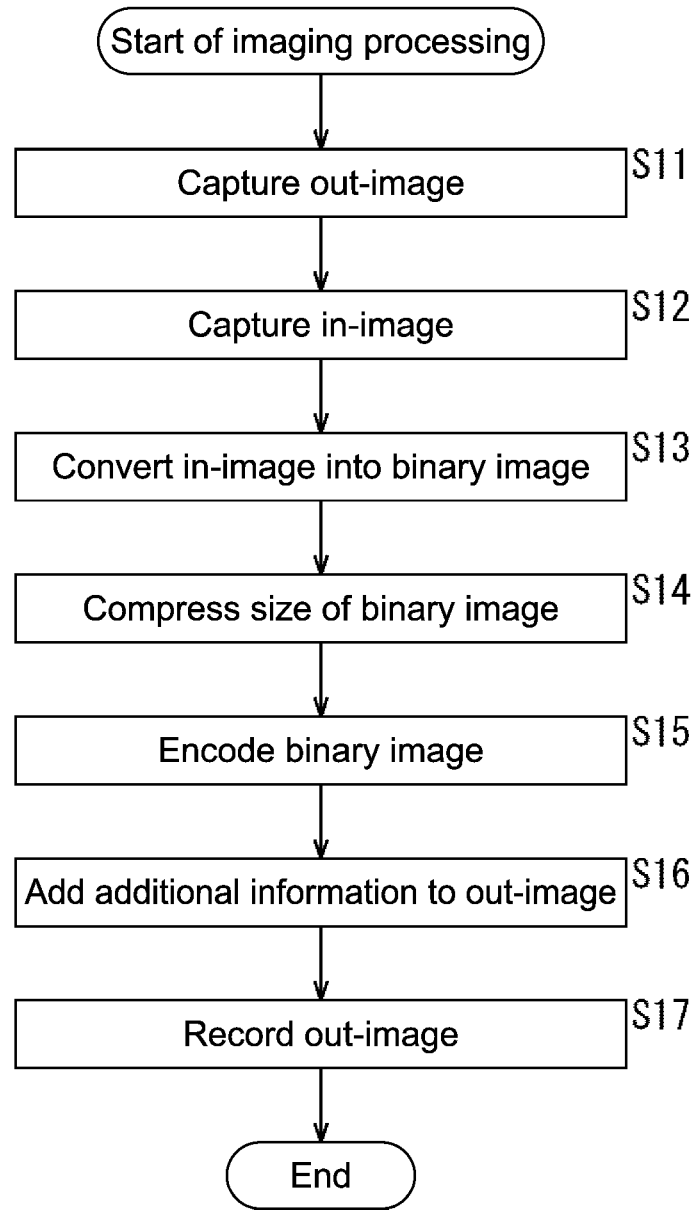
FIG. 5 is a flowchart for describing imaging processing.

Referring back to the description on the flowchart of FIG. 5, in Step S16, the additional processing unit 82 adds the additional information, which is supplied from the compression unit 81, to the image data of the out-image supplied from the out-image capturing unit 23, and supplies the resultant data to the recording unit 54. In other words, the additional information is embedded in the image data of the out-image, to serve as metadata of the out-image.

In Step S17, the recording unit 54 records the out-image supplied from the additional processing unit 82, and then the imaging processing is terminated.

As described above, the image processing apparatus 11 compresses the information of the in-image captured simultaneously with the out-image to covert the information into additional information, and adds the additional information to the out-image. In such a manner, the additional information is added to the out-image, and thus it is possible to display an image more effectively and also improve convenience using the additional information at the time when the out-image is reproduced.

For example, in the image processing apparatus 11, the additional information is added to the out-image, and thus whether to display only the out-image or whether to display the out-image using the additional information can be specified at the time of reproduction. Therefore, it is possible to display the out-image more effectively and also improve convenience.

In addition, when capturing the out-image, the user does not need an operation to give an instruction to combine an image obtained from the in-image with the out-image, and can thus concentrate on an imaging operation. Consequently, user's convenience can further be improved.

<Description on Reproduction Processing>

When the out-image is recorded in the recording unit 54, the user can operate the operation input unit 51 to reproduce the recorded out-image. At that time, the user operates the operation input unit 51, for example, and can thus select whether to display only the out-image or whether to combine an image, which is obtained from the additional information, with the out-image for display.

Hereinafter, with reference to a flowchart of FIG. 7, description will be given on reproduction processing performed by the image processing apparatus 11 when the user gives an instruction to reproduce the out-image.

In Step S41, the extraction unit 83 reads the out-image, which is specified by the user according to an instruction of the control unit 52, from the recording unit 54.

In Step S42, the extraction unit 83 supplies the read out-image to the reproduction unit 85, and also reads additional information from the image data of the out-image to supply the additional information to the decoding unit 84.

In Step S43, the decoding unit 84 decodes the additional information supplied from the extraction unit 83. For example, in the case where the additional information is a run length code, the decoding unit 84 restores the binary image from the run length code.

In Step S44, the decompression unit 94 decompresses the size of the binary image obtained by decoding. For example, a binary image having a thumbnail size of 160×120 pixels is enlarged to be a binary image having an appropriate size.

The decoding unit 84 supplies the binary image, which is decompressed by the decompression unit 94, to the reproduction unit 85 as the image obtained from the additional information.

In Step S45, the reproduction unit 85 determines whether to reproduce the binary image.

For example, in the case where the user operates the operation input unit 51 and gives an instruction to combine the binary image obtained from the additional information with the out-image for display, a signal indicating the instruction is supplied from the control unit 52 to the signal processing unit 53. In the case where the signal supplied from the control unit 52 to the signal processing unit 53 indicates that the binary image is combined with the out-image for display, the reproduction unit 85 determines that the binary image is reproduced.

When it is determined in Step S45 that the binary image is reproduced, in Step S46, the combining unit 95 combines the binary image, which is supplied from the decoding unit 84, with the out-image supplied from the extraction unit 83. For example, a position on the out-image at which the binary image is combined may be a position determined in advance, a position specified by the user, or a position in a background area without a subject (foreground), which is identified by image recognition or the like.

The reproduction unit 85 supplies the out-image with which the binary image is combined to the display unit 21 and controls display of the out-image.

In Step S47, the display unit 21 displays the out-image, which is supplied from the reproduction unit 85 and with which the binary image is combined, and the reproduction processing is terminated.

Additionally, when it is determined in Step S45 that the binary image is not reproduced, the reproduction unit 85 supplies the out-image supplied from the extraction unit 83 to the display unit 21 as it is, and the processing proceeds to Step S48. In this case, the out-image with which the binary image is not combined is supplied to the display unit 21.

In Step S48, the display unit 21 displays the out-image supplied from the reproduction unit 85, and the reproduction processing is terminated.

In such a way, the image processing apparatus 11 displays the out-image as it is according to a user's instruction or combines the binary image, which is obtained from the additional information added to the out-image, with the out-image for display.

If the additional information added to the out-image is used in such a manner, it is possible to display only the out-image in accordance with, for example, a feeling of the user at that time or display the out-image with which the binary image is combined. Consequently, it is possible to display the out-image more effectively and improve convenience.

In particular, if the binary image is combined with the out-image, a user who views the out-image can know a facial expression of the face of the user when capturing the out-image or the like, and can thus enjoy viewing the out-image more.

Hereinabove, the cases where a monochrome conversion, binarization, a reduction in size, and encoding of the in-image are performed have been described as an example in which the information of an in-image is compressed, but any types of those compression processing may be appropriately performed in combination. For example, only the monochrome conversion of the in-image may be performed to obtain additional information, or the monochrome conversion and encoding of the in-image may be performed to obtain additional information. Additionally, a part of an area of the in-image may be compressed, and the resultant image or code may be obtained as additional information.

Second Embodiment

<Configuration Example of Signal Processing Unit>

Although the example in which the binary image obtained from the in-image is generated as additional information has been described hereinabove, other information in addition to the binary image may be generated as additional information. For example, the binary image and photographer information obtained from the in-image may be generated as additional information.

Figure 8:
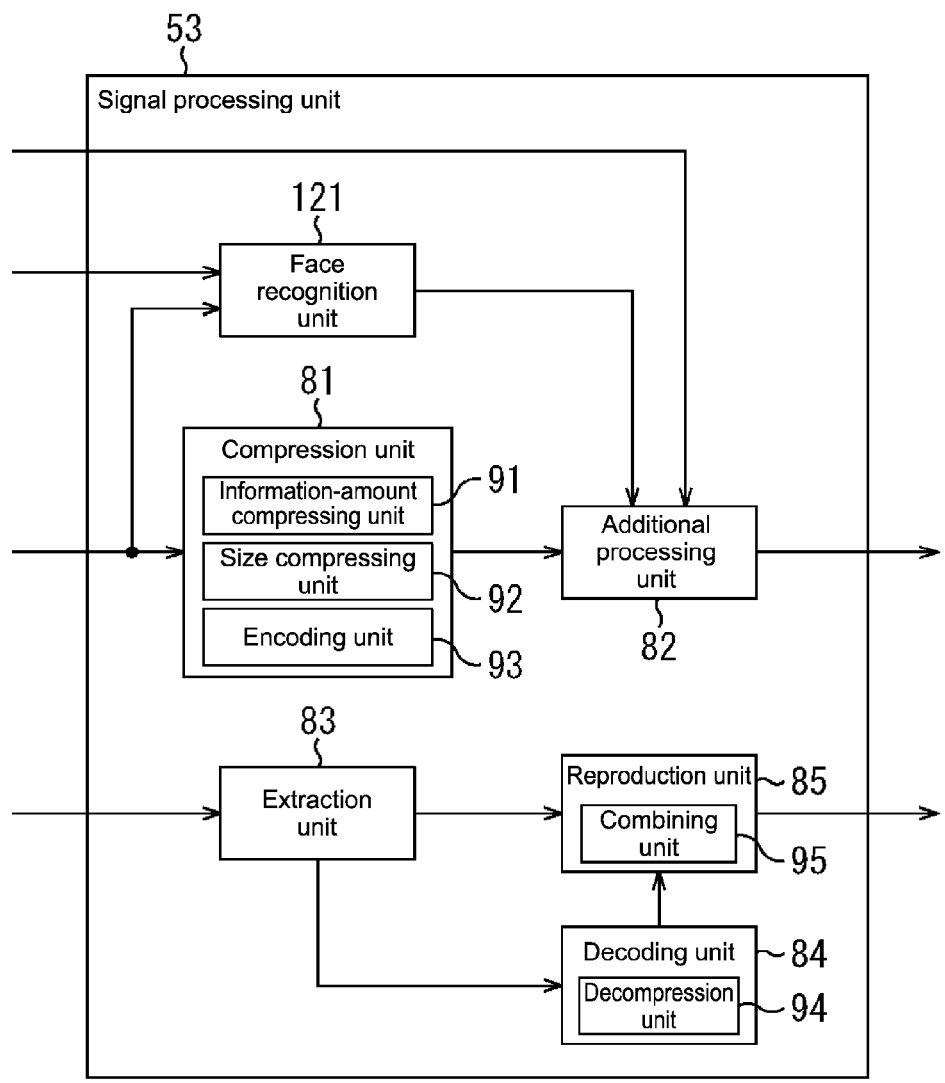
FIG. 8 is a diagram showing a configuration example of the signal processing unit.

In this case, the signal processing unit 53 has, for example, a configuration shown in FIG. 8. In FIG. 8, the same reference numerals are given to portions corresponding to the portions in FIG. 4 and description thereof will be appropriately omitted.

The signal processing unit 53 shown in FIG. 8 includes a compression unit 81, an additional processing unit 82, an extraction unit 83, a decoding unit 84, a reproduction unit 85, and a face recognition unit 121. In other words, the signal processing unit 53 of FIG. 8 has a configuration in which the signal processing unit 53 of FIG. 4 further includes the face recognition unit 121.

The face recognition unit 121 performs face recognition on an in-image supplied from the in-image capturing unit 22 by using registered information recorded in advance in the recording unit 54, and supplies a result of the recognition to the additional processing unit 82 as additional information.

For example, in the recording unit 54, a feature amount of an image of the face of a user registered in advance, a discriminator of the face of the user, and the like are associated with a user name of the user, and the associated information is recorded as registered information. The face recognition unit 121 identifies the user on the in-image by face recognition using the registered information and the in-image, and sets the result of the identification (the result of the face recognition) as additional information.

The additional processing unit 82 sets, as additional information, the result of the face recognition supplied from the face recognition unit 121 and the binary image supplied from the compression unit 81, and adds the additional information to the out-image from the out-image capturing unit 23, to supply the resultant out-image to the recording unit 54.

<Description on Imaging Processing>

Next, with reference to a flowchart of FIG. 9, description will be given on imaging processing performed when the signal processing unit 53 has the configuration shown in FIG. 8.

Since processing of Steps S71 to S75 are similar to the processing of Steps S11 to S15 of FIG. 5, description thereof will be omitted. In Step S72, however, an in-image obtained by imaging is supplied from the in-image capturing unit 22 to the compression unit 81 and the face recognition unit 121.

In Step S76, the face recognition unit 121 performs face recognition on the in-image supplied from the in-image capturing unit 22 using registered information recorded in the recording unit 54 and supplies a result of the recognition as additional information to the additional processing unit 82. For example, the user name of the user identified as a result of the face recognition, that is, photographer information is supplied to the additional processing unit 82 as additional information.

It should be noted that as a result of the face recognition, in the case where the user on the in-image is a new user who is not registered or a user whose user name is not recorded as registered information, registration processing and the like are performed as necessary.

In Step S77, the additional processing unit 82 adds the photographer information supplied from the face recognition unit 121 and the encoded binary image supplied from the compression unit 81 to the image data of the out-image supplied from the out-image capturing unit 23, as additional information, and supplies the resultant data to the recording unit 54.

In Step S78, the recording unit 54 records the out-image supplied from the additional processing unit 82, and then the imaging processing is terminated.

As described above, the image processing apparatus 11 adds the photographer information and the binary image obtained from the in-image as additional information to the out-image.

Consequently, it is possible to more effectively display the out-image and also improve convenience. For example, if the photographer information generated as additional information is used, it is possible to effectively display the out-image, for example, to display a list of out-images captured by a specific photographer.

<Description on Reproduction Processing>

Additionally, when the out-image is recorded in the recording unit 54, the user can operate the operation input unit 51 to display a list of out-images captured by a specific user. At that time, the user operates the operation input unit 51, for example, and can thus select whether to display only out-images or whether to combine an image, which is obtained from the additional information, with the out-images for display.

Hereinafter, with reference to a flowchart of FIG. 10, description will be given on reproduction processing performed by the image processing apparatus 11 when the user gives an instruction to display a list of out-images.

In Step S101, the extraction unit 83 reads all out-images recorded in the recording unit 54.

In Step S102, the extraction unit 83 reads the photographer information as additional information, which is added to each of the read out-images, and detects an out-image captured by a specific photographer.

For example, the specific photographer is assumed to be a photographer that is input by the user operating the operation input unit 51. The control unit 52 reads the registered information from the recording unit 54 via the signal processing unit 53 as necessary, based on a signal from the operation input unit 51, and supplies information indicating a photographer specified by the user to the signal processing unit 53. As a result, the extraction unit 83 detects an out-image captured by the specific photographer, based on the information supplied from the control unit 52.

In Step S103, the extraction unit 83 supplies only the detected out-image of the specific photographer to the reproduction unit 85, and also reads the encoded binary image as additional information from the image data of the out-image of the specific photographer, to supply the information to the decoding unit 84. For example, a run length code is supplied to the decoding unit 84 as the encoded binary image.

After the additional information is read from the out-image, the processing of Steps S104 to S107 are performed.

Figure 7:
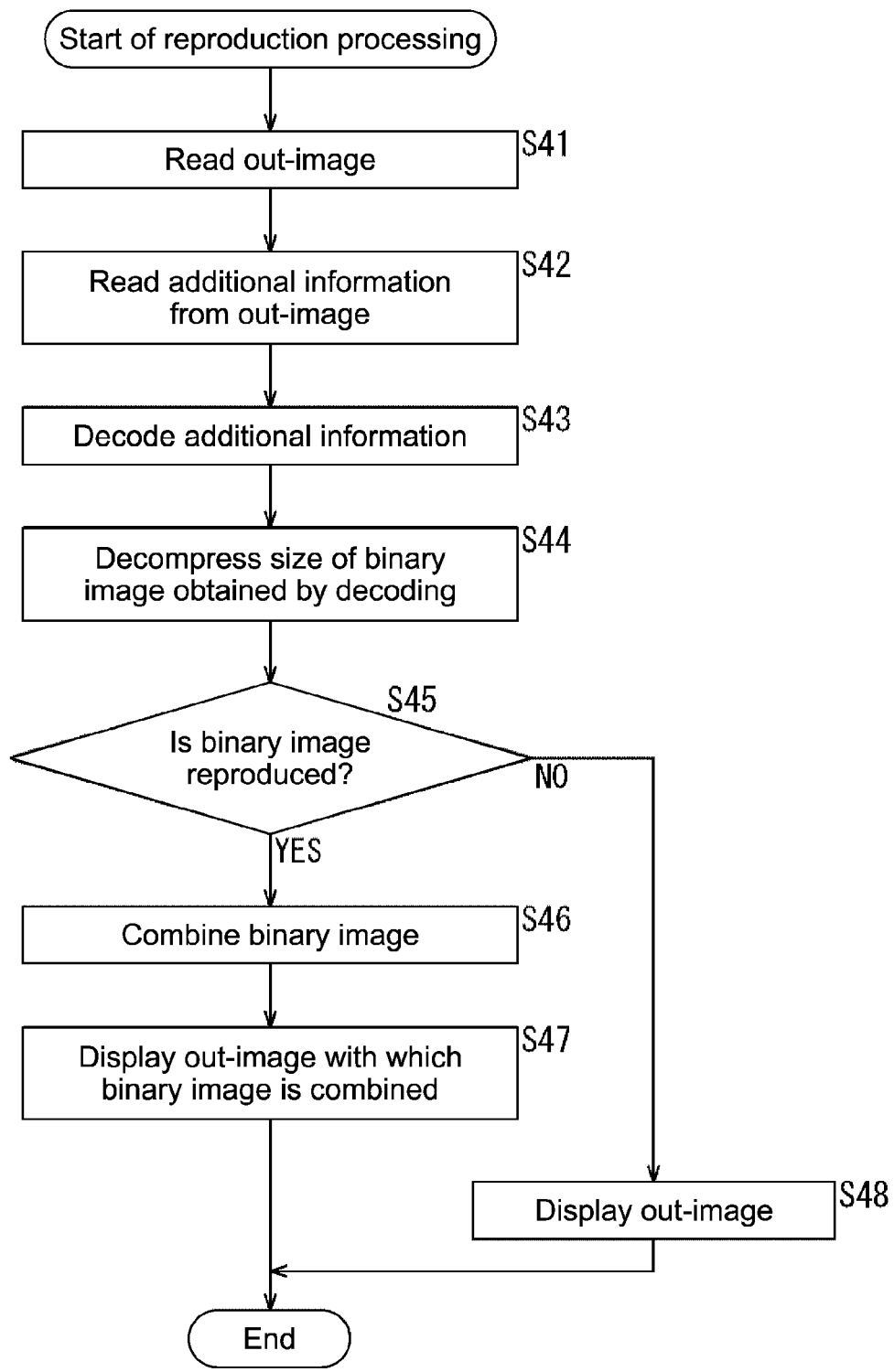
FIG. 7 is a flowchart for describing reproduction processing.

Since those processing are similar to the processing of Steps S43 to S46 in FIG. 7, description thereof will be omitted.

In Steps S104 to S107, however, for all the out-images captured by the specific photographer, the encoded binary image as additional information read from each of the out-images is decoded, and the binary images are combined with the respective out-images.

In Step S108, the display unit 21 displays a list of the out-images, which are supplied from the reproduction unit 85 and with which the binary images are combined, and the reproduction processing is terminated.

Figure 11:
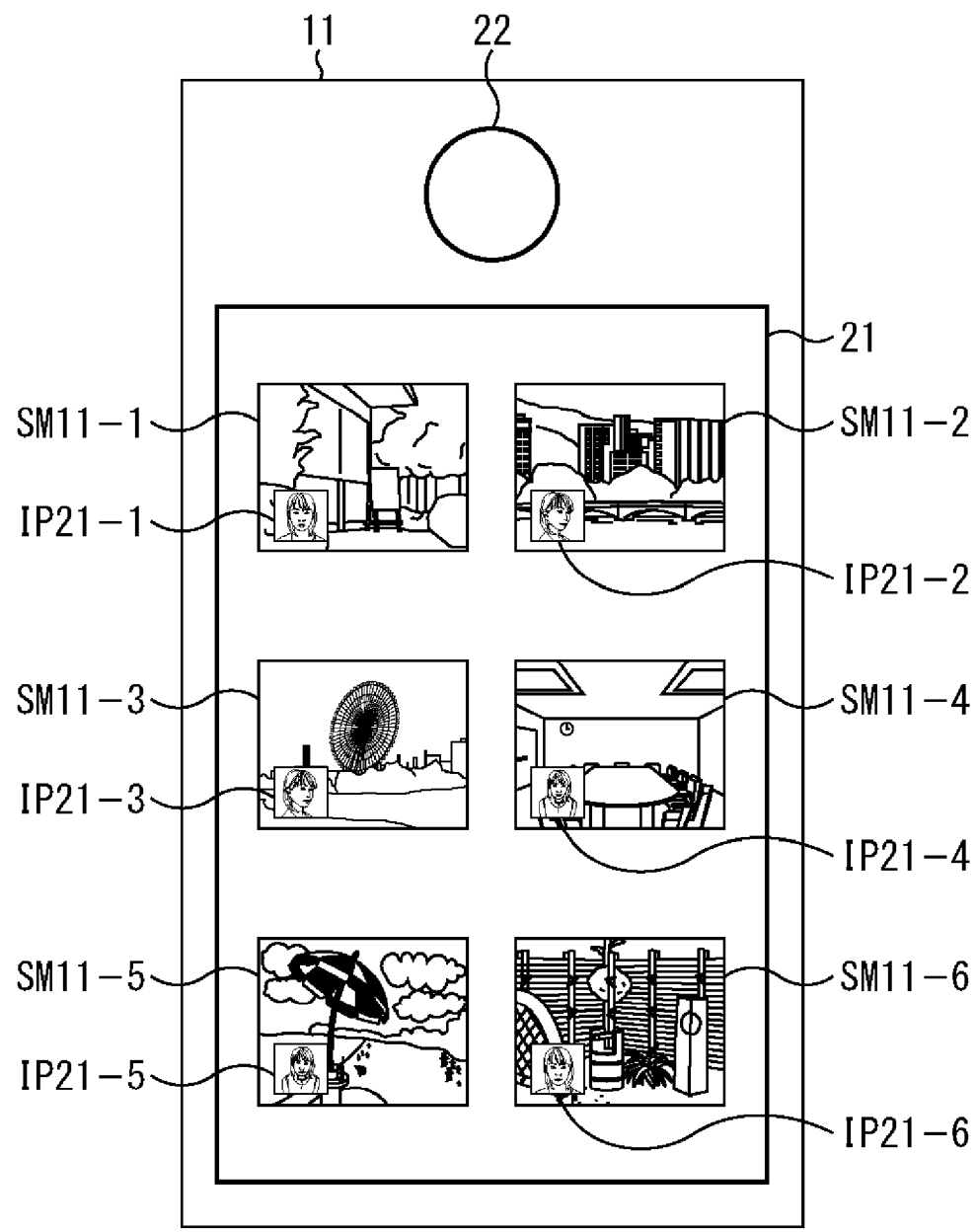
FIG. 11 is a diagram showing a display example of a list of out-images.

Consequently, out-images SM11-1 to SM11-6 shown in FIG. 11, for example, are displayed on the display unit 21. In this example, the six out-images SM11-1 to SM11-6 are arranged for display on the display unit 21. Binary images IP21-1 to IP21-6 as additional information are combined with those out-images SM11-1 to SM11-6, respectively, for display.

In such a manner, only the out-images of a specific photographer are displayed in a list, and thus the user can more easily find out an out-image that the user wants to view. In other words, it is possible to more effectively display the out-images.

For example, when the out-images SM11-1 to SM11-6 are displayed in a list, the user can operate the operation input unit 51 to display only one of those out-images on the display unit 21 or display those out-images in a slide show.

It should be noted that here, the example in which the binary image is combined with each out-image for display has been described, but an image of the face of the user may be recorded in advance as registered information to be combined with the out-image for display.

Figure 10:
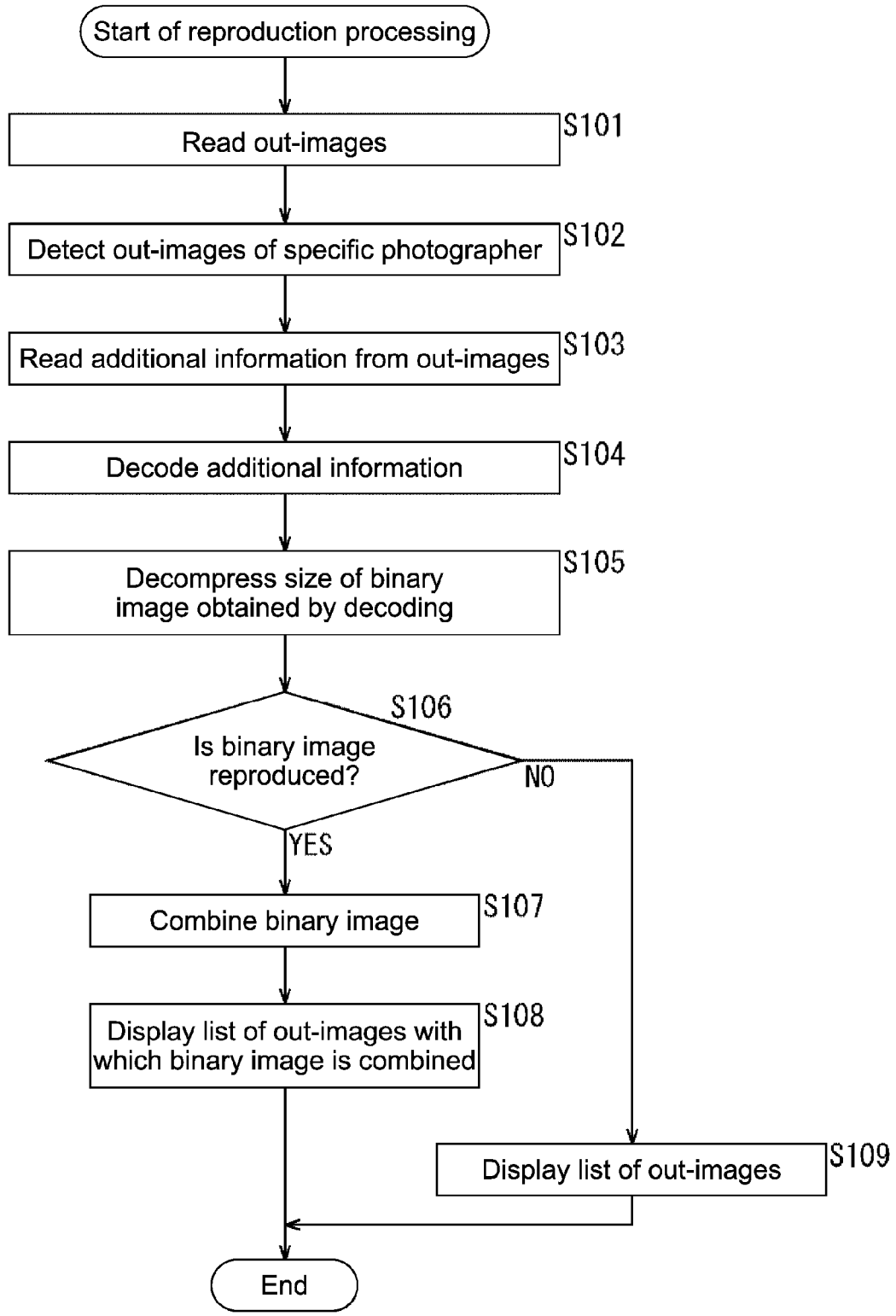
FIG. 10 is a flowchart for describing reproduction processing.

Referring back to the description of the flowchart of FIG. 10, when it is determined in Step S106 that the binary images are not reproduced, the reproduction unit 85 supplies the out-images, which are supplied from the extraction unit 83, to the display unit 21 as they are, and the processing proceeds to Step S109.

In Step S109, the display unit 21 displays a list of the out-images supplied from the reproduction unit 85, and the reproduction processing is terminated.

Figure 12:
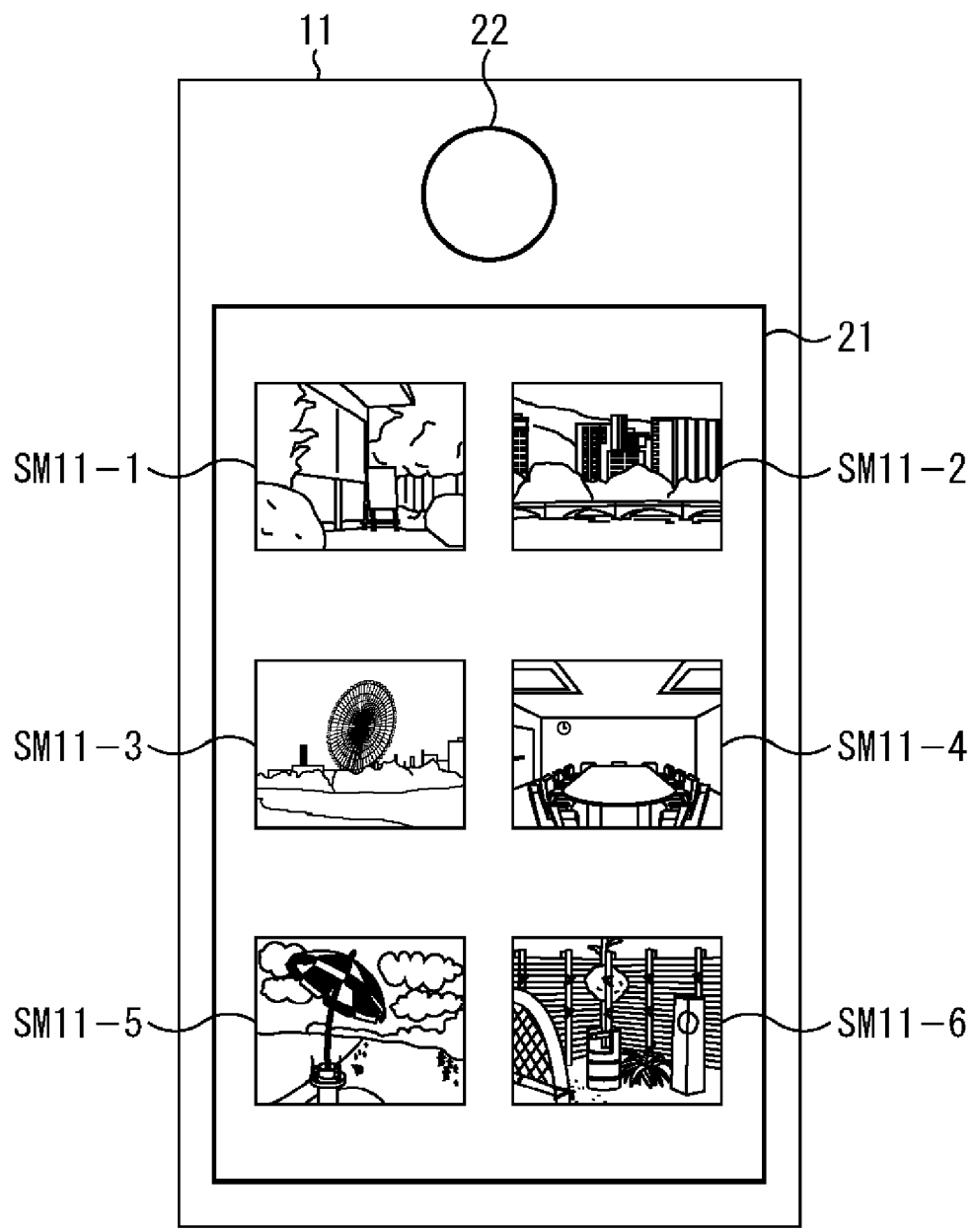
FIG. 12 is a diagram showing a display example of a list of out-images.

Consequently, the out-images SM11-1 to SM11-6 shown in FIG. 12, for example, are displayed on the display unit 21. It should be noted that in FIG. 12, the same reference symbols are given to portions corresponding to the case in FIG. 11 and description thereof will be appropriately omitted.

In the example of FIG. 12, the six out-images SM11-1 and SM11-6 are arranged for display on the display unit 21. On those out-images SM11-1 to SM11-6, binary images as additional information are not displayed.

In such a manner, only the out-images of a specific photographer are displayed in a list, and thus the user can more easily find out an out-image that the user wants to view, as in the example of FIG. 11.

For example, when the out-images SM11-1 to SM11-6 are displayed in a list, the user can operate the operation input unit 51 to display only one of those out-images on the display unit 21 or display those out-images in a slide show.

As described above, the image processing apparatus 11 detects the out-images of a specific photographer using photographer information. The photographer information is added to the out-images as additional information. The image processing apparatus 11 then displays a list of the detected out-images. Additionally, when displaying the list of the out-images, the image processing apparatus 11 combines the binary images with the respective out-images for display according to a user's instruction.

If the photographer information that is added to each out-image and serves as additional information is used in such a manner, it is possible to more effectively display the out-images, for example, to display only the out-images of a specific photographer, and also improve convenience. Additionally, if the encoded binary image as additional information is used, it is possible to display only the out-image or display the out-image with which the binary image is combined, when a list of the out-images is displayed.

Third Embodiment

<Configuration Example of Signal Processing Unit>

Although the case where the encoded binary image and the photographer information are generated as additional information has been described hereinabove, information indicating a gaze area on the out-image may be generated as additional information. Here, the gaze area refers to an area on the out-image, at which the user as a photographer gazes when capturing the out-image.

Figure 13:
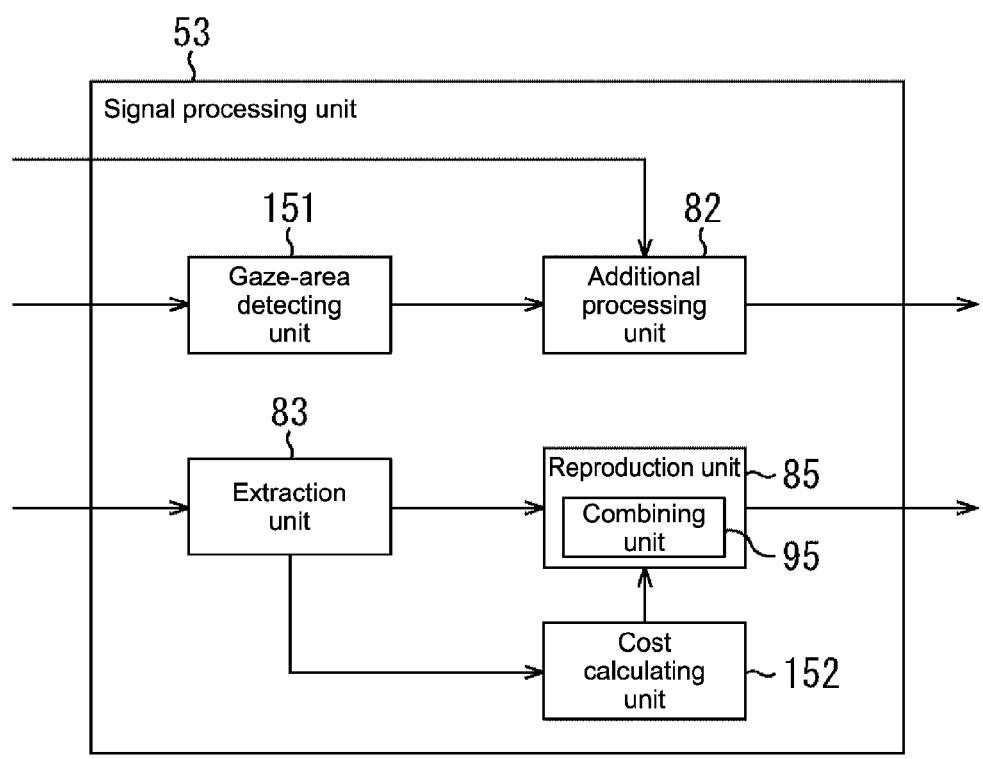
FIG. 13 is a diagram showing a configuration example of the signal processing unit.

In the case where information indicating a gaze area is generated as additional information in such a manner, the signal processing unit 53 has a configuration shown in FIG. 13, for example. It should be noted that in FIG. 13, the same reference numerals are given to portions corresponding to the portions in FIG. 4 and description thereof will be appropriately omitted.

The signal processing unit 53 shown in FIG. 13 includes a gaze-area detecting unit 151, an additional processing unit 82, an extraction unit 83, a cost calculating unit 152, and a reproduction unit 85. In other words, the signal processing unit 53 of FIG. 13 has a configuration in which the signal processing unit 53 of FIG. 4 includes the gaze-area detecting unit 151 and the cost calculating unit 152 instead of the compression unit 81 and the decoding unit 84.

The gaze-area detecting unit 151 detects a gaze area or an area on the out-image at which the user is gazing, based on an in-image supplied from the in-image capturing unit 22, and supplies a result of the detection to the additional processing unit 82 as additional information.

The additional processing unit 82 adds information indicating the result of the detection of gaze area, which is supplied from the gaze-area detecting unit 151, to the image data of an out-image supplied from the out-image capturing unit 23, the information serving as additional information. The additional processing unit 82 supplies the resultant information to the recording unit 54.

The cost calculating unit 152 calculates, as cost, the degree of overlap of gaze areas in the case where a plurality of out-images are simultaneously or sequentially superimposed and displayed, based on the information indicating the result of the detection of gaze area as additional information supplied from the extraction unit 83. The cost calculating unit 152 supplies the cost to the reproduction unit 85.

The reproduction unit 85 controls the display of the out-images by the display unit 21 based on the cost supplied from the cost calculating unit 152, and superimposes the plurality of out-images for display such that the gaze areas of the respective out-images do not overlap each other as much as possible.

<Description on Imaging Processing>

Figure 14:
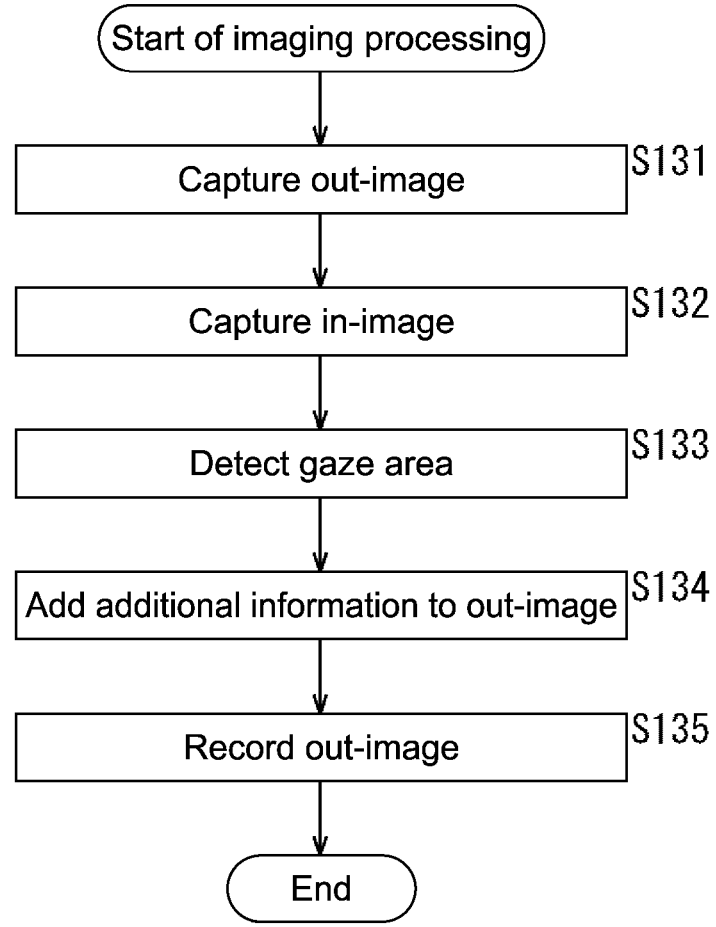
FIG. 14 is a flowchart for describing imaging processing.

Next, with reference to a flowchart of FIG. 14, description will be given on imaging processing performed when the signal processing unit 53 has the configuration shown in FIG. 13.

Since processing of Steps S131 and S132 are similar to the processing of Steps S11 and S12 of FIG. 5, description thereof will be omitted.

Additionally, in Step S131, at the time when an out-image is captured, an image that is taken in by the out-image capturing unit 23 is supplied as a preview image of the out-image to the display unit 21 via the reproduction unit 85 of the signal processing unit 53, and then displayed. In other words, with the preview image of the out-image being displayed on the display unit 21, the user operates the operation input unit 51 to give an instruction to capture an out-image.

In Step S133, the gaze-area detecting unit 151 detects a line-of-sight direction of the user at the time when an out-image is captured, based on the in-image supplied from the in-image capturing unit 22, to detect a gaze area of the user on the out-image.

For example, the gaze-area detecting unit 151 detects an area of a human face from the in-image, to determine an eye area on the detected face area. The gaze-area detecting unit 151 then performs pattern matching using the determined eye area and a learning data group prepared in advance, to obtain a line-of-sight direction of the user. For example, in the pattern matching, a line-of-sight that is associated with learning data having a highest score in matching with the eye area is a line-of-sight direction to be obtained.

Additionally, the gaze-area detecting unit 151 calculates a relative positional relationship between an actual position of the face of the user and the in-image capturing unit 22 and display unit 21, based on the position and the size of the face of the user on the in-image, and detects a gaze area based on the positional relationship and the line-of-sight direction. In other words, since the preview image of the out-image is displayed on the display unit 21 when the in-image is captured, an area of the out-image, which is displayed on an area of the display unit 21 and at which the user is gazing when the in-image is captured, should be an area at which the user is gazing.

It should be noted that the technology to detect a line of sight and specify a gaze area of a user is described in, for example, the specification of U.S. Pat. No. 6,246,779.

When detecting a gaze area on the out-image based on the in-image, as a result of the detection, the gaze-area detecting unit 151 supplies coordinates of a rectangular area (coordinates of a rectangle) on the out-image to the additional processing unit 82 as additional information, the rectangular area indicating a gaze area, for example.

In Step S134, the additional processing unit 82 adds the additional information, which is supplied from the gaze-area detecting unit 151, to the image data of the out-image supplied from the out-image capturing unit 23 and supplies the resultant data to the recording unit 54.

In Step S135, the recording unit 54 records the out-image supplied from the additional processing unit 82, and the imaging processing is terminated.

As described above, the image processing apparatus 11 obtains information indicating a gaze area of the out-image as additional information, the information being detected based on the in-image simultaneously captured with the out-image. The image processing apparatus 11 then adds the additional information to the out-image.

In such a manner, the additional information is added to the out-image, and thus it is possible to display an image more effectively and also improve convenience using the additional information at the time when the out-image is reproduced. For example, when a plurality of out-images are simultaneously displayed, the plurality of out-images can be displayed such that the gaze areas of the respective out-images do not overlap each other as much as possible. Information that indicates a gaze area and is generated as additional information is information obtained only when the out-image is captured. If such information is used when the out-image is displayed, the out-image can be effectively presented.

<Description on Reproduction Processing>

Additionally, when the out-image is recorded in the recording unit 54, the user can operate the operation input unit 51 to display the out-images in a slide show. At that time, the user operates the operation input unit 51, for example, and can thus select whether to display out-images one by one or whether to superimpose the plurality of out-images for simultaneous display.

Hereinafter, with reference to a flowchart of FIG. 15, description will be given on reproduction processing performed by the image processing apparatus 11 when the user gives an instruction to display out-images in a slide show.

Since processing of Steps S161 and S162 are similar to the processing of Steps S41 and S42 of FIG. 7, description thereof will be omitted.

In Step S161, however, a plurality of out-images such as out-images in a folder specified by the user are read, for example. Additionally, in Step S162, information indicating a gaze area as additional information read from each of the out-images is supplied from the extraction unit 83 to the cost calculating unit 152.

In Step S163, the cost calculating unit 152 calculates the degree of overlap of subjects, as cost, based on the information indicating gaze areas as additional information supplied from the extraction unit 83, and supplies the cost to the reproduction unit 85.

Specifically, the cost calculating unit 152 calculates the degree of importance of each area of the out-image, with the gaze area being as a saliency (important point). For example, the degree of importance of a gaze area is raised and the degree of importance of other areas except for the gaze area is lowered. At that time, the degree of importance may be raised more at a position closer to the center of the gaze area.

Based on the thus calculated degree of importance of each area of the out-image, the cost calculating unit 152 calculates the cost of the degree of overlap of subjects for the way to superimpose the plurality of out-images simultaneously displayed, and supplies the cost to the reproduction unit 85. For example, when the out-images are superimposed in such a manner that an area having a higher degree of importance is hidden by another overlapping out-image, cost is calculated so as to be raised more.

In Step S164, the reproduction unit 85 determines whether to superimpose the plurality of out-images for display or not.

When it is determined in Step S164 that the plurality of out-images are superimposed for display, in Step S165, the combining unit 95 superimposes and combines the plurality of out-images supplied from the extraction unit 83, based on the cost supplied from the cost calculating unit 152.

For example, the combining unit 95 combines the plurality of out-images by a superimposing way determined by the lowest cost supplied from the cost calculating unit 152. Consequently, the plurality of out-images are superimposed such that main subjects of the respective out-images do not overlap each other as much as possible, that is, the gaze areas are not hidden by other out-images.

The reproduction unit 85 supplies the plurality of combined out-images to the display unit 21 and gives an instruction to display the plurality of out-images in a slide show.

In Step S166, the display unit 21 displays the plurality of combined out-images, which are supplied from the reproduction unit 85, in a slide show with the plurality of out-images being simultaneously displayed. The reproduction processing is terminated.

Figure 16:
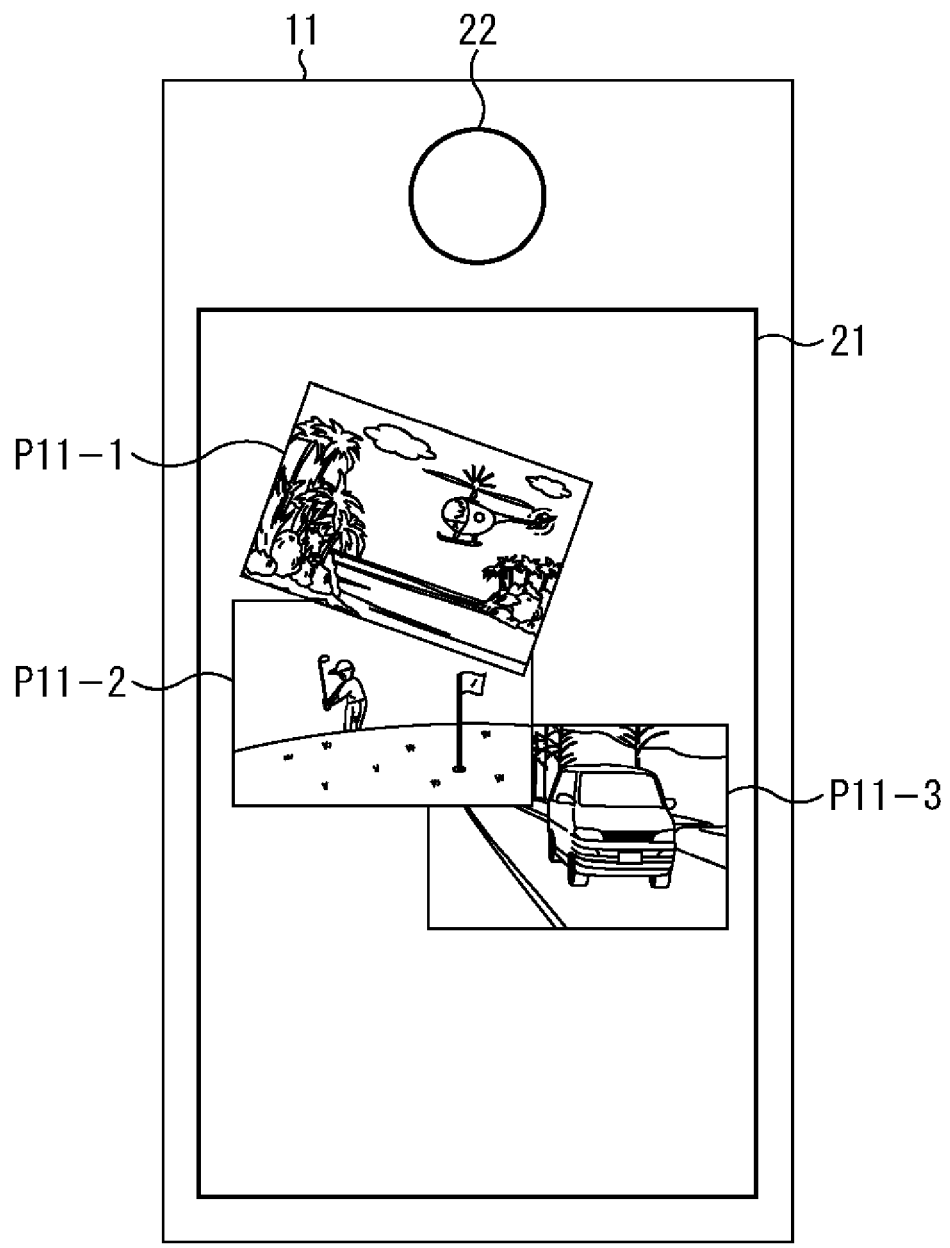
FIG. 16 is a diagram showing a display example of out-images in a slide show.

Consequently, the out-images shown in FIG. 16, for example, are displayed on the display unit 21.

In the example of FIG. 16, three out-images P11-1 to P11-3 are displayed on the display unit 21. Those out-images partially overlap each other. In particular, in this example, the three out-images are superimposed such that main subjects of the respective out-images are not hidden by other out-images.

It should be noted that in a method of superimposing the plurality of out-images for display, the out-images may be sequentially superimposed for display one by one, or may be superimposed for simultaneous display and then followed by a plurality of different out-images that are simultaneously displayed.

The technology to superimpose and display a plurality of images based on a saliency of image is described in, for example, the specification of U.S. Pat. No. 7,595,809.

Figure 15:
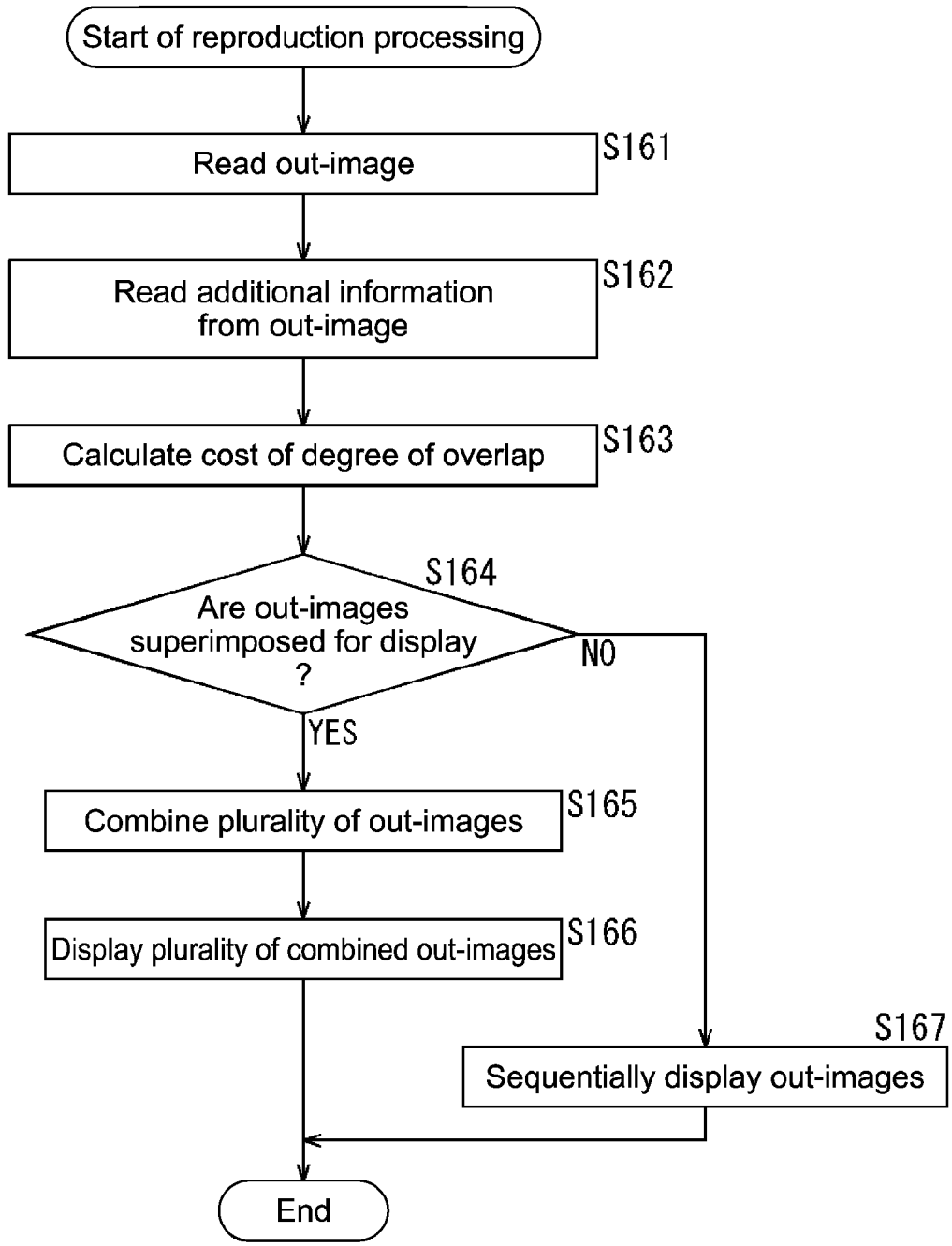
FIG. 15 is a flowchart for describing reproduction processing.

Referring back to the description on the flowchart of FIG. 15, when it is determined in Step S164 that the out-images are not superimposed for display, the reproduction unit 85 sequentially supplies the out-images, which are supplied from the extraction unit 83, to the display unit 21. The processing proceeds to Step S167.

In Step S167, the display unit 21 sequentially display the out-images supplied from the reproduction unit 85, to display the out-images in a slide show. The reproduction processing is terminated.

As described above, the image processing apparatus 11 superimposes the plurality of out-images for display such that the different out-images do not overlap each other at the respective gaze areas as much as possible, based on the information indicating the gaze areas, the information being added as additional information to the out-images. In such a manner, the additional information that can be obtained only when the out-images are captured is used, and thus the out-images can be displayed more effectively.

Hereinabove, the example in which the information indicating gaze areas as additional information is used for superimposing the out-images for display has been described, but the information indicating gaze areas may be used for another method of displaying out-images. For example, in the case where the out-images are sequentially displayed one by one, based on the information indicating gaze areas, the gaze area of the out-image may be enlarged for display (zoomed).

Fourth Embodiment

<Configuration Example of Signal Processing Unit>

A part of the in-image may be obtained as additional information, and the image serving as the additional information may be combined with an out-image at the time when the out-image is reproduced.

Figure 17:
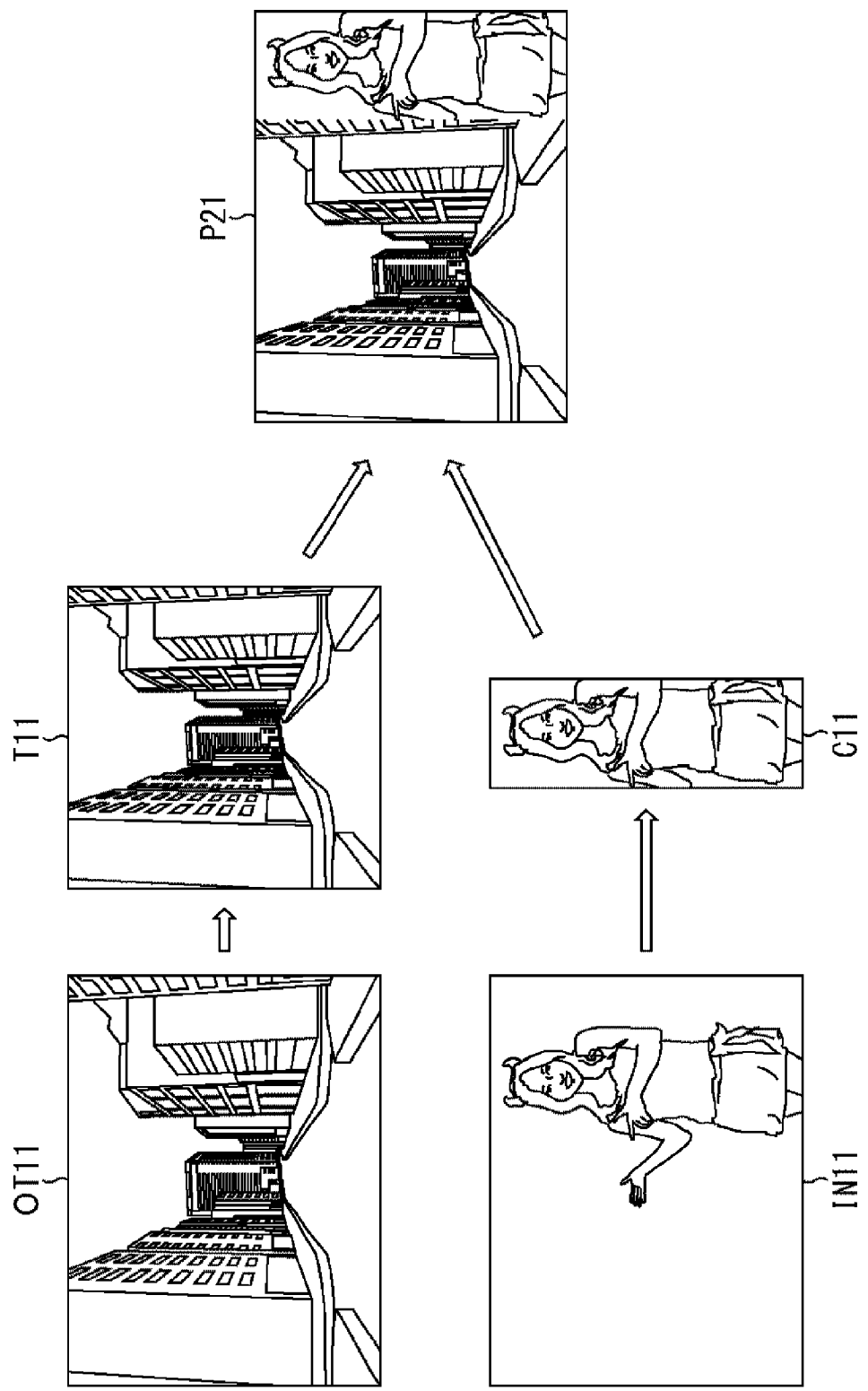
FIG. 17 is a diagram for describing a composite image.

Specifically, as shown in FIG. 17, for example, it is assumed that an out-image OT11 having a subject of a landscape and an in-image IN11 having a subject of a user are captured.

In this case, viewing-angle conversion processing is performed on the out-image OT11, and the resultant image T11 is obtained as a final out-image. In this example, the image T11 is an image obtained by converting an aspect ratio of the out-image OT11. In the image T11, all the subjects on the out-image OT11 appear. In other words, the image T11 is an image obtained by contracting the out-image OT11 in a horizontal direction of the figure.

Additionally, processing such as face recognition is performed on the in-image IN11, an area of a main subject is detected from the in-image IN11, and an area including the area of the main subject of the in-image IN11 is cut out, to obtain an image C11 as additional information. In particular, in the case where the main subject is a human face, when image transformation processing is performed on the area of the main subject, the human face is distorted. Here, the area of the main subject is cut out, and thus an image without distortion is obtained.

It should be noted that a ratio of a length in a vertical direction to a length in a horizontal direction of the image T11 in the figure is assumed to be specified in advance as an out-side aspect parameter. Similarly, a ratio of a length in a vertical direction to a length in a horizontal direction of the image C11 in the figure is assumed to be specified in advance as an in-side aspect parameter.

Additionally, those out-side aspect parameter and in-side aspect parameter are determined such that an aspect ratio of an image, which is obtained when the image T11 and the image C11 are arranged in the horizontal direction in the figure to become one image, becomes the same as the aspect ratio of the original out-image OT11.

When the image C11 is obtained in such a manner, the image C11 is added to the image data of the image T11 as additional information.

At the time when the image T11 is reproduced, the user can select whether to reproduce the image T11 as it is or whether to combine the image C11 as additional information with the image T11 for display.

For example, in the case where an instruction is given to display an image in which the image C11 is combined with the image T11, the image processing apparatus 11 arranges the image T11 and the image C11 in the horizontal direction in the figure and combines those images, to generate a composite image P21. The image processing apparatus 11 then displays the obtained composite image P21.

For example, in the case where the in-image and the out-image are partially cut out to be coupled to each other, there is a possibility that main subjects or landscapes are deleted. In contrast to this, the composite image P21 is an image showing a state of a photographer when the out-image OT11 is captured, while leaving all the content of the original out-image OT11, and thus it is possible to more effectively display images.

Additionally, in the case where the in-image and the out-image are simply arranged to be coupled to each other, the aspect ratios of the images are changed, and due to the difference in aspect ratio from the display unit 21, for example, a trouble occurs in which the images should be displayed in small size. In contrast to this, the composite image P21 has the same aspect ratio as the original out-image OT11, and thus there is no trouble in display.

Figure 18:
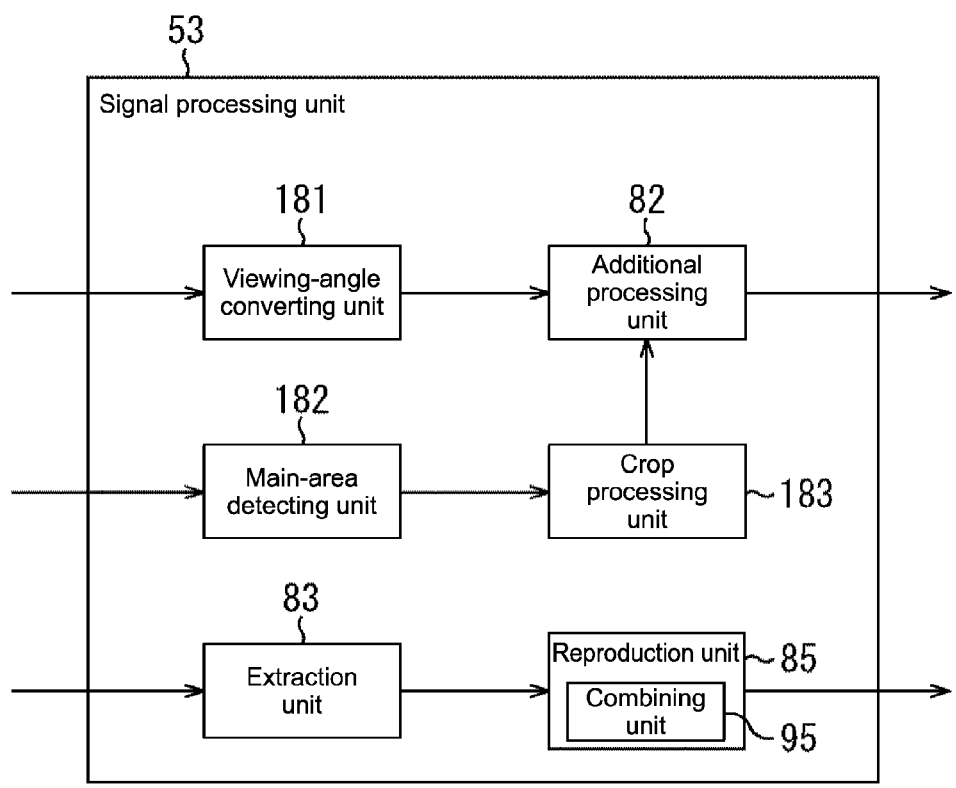
FIG. 18 is a diagram showing a configuration example of the signal processing unit.

In the case where a part of the in-image is cut out to be obtained as additional information in such a manner, the signal processing unit 53 has a configuration shown in FIG. 18, for example. It should be noted that in FIG. 18, the same reference numerals are given to portions corresponding to the portions in FIG. 4 and description thereof will be appropriately omitted.

The signal processing unit 53 shown in FIG. 18 includes a viewing-angle converting unit 181, an additional processing unit 82, a main-area detecting unit 182, a crop processing unit 183, an extraction unit 83, and a reproduction unit 85.

The viewing-angle converting unit 181 performs viewing-angle conversion processing on an out-image supplied from the out-image capturing unit 23 such that the out-image obtains a target aspect ratio based on a specified out-side aspect parameter, and supplies the resultant image to the additional processing unit 82.

The main-area detecting unit 182 detects an area of a main subject (hereinafter, referred to as main area) from an in-image supplied from the in-image capturing unit 22 and supplies a result of the detection and the in-image to the crop processing unit 183.

Based on the result of the detection on the main area, which is supplied from the main-area detecting unit 182, and the specified in-side aspect parameter, the crop processing unit 183 cuts out an area including the main area of the in-image to obtain a cropped image, and supplies the cropped image to the additional processing unit 82. In other words, a cropped image obtained by the crop processing performed on the in-image is supplied to the additional processing unit 82 as additional information.

The additional processing unit 82 adds the cropped image to the out-image supplied from the viewing-angle converting unit 181, the cropped image being supplied from the crop processing unit 183 as additional information. The additional processing unit 82 supplies the resultant image to the recording unit 54.

The extraction unit 83 extracts the additional information from the out-image read from the recording unit 54 and supplies the out-image and the additional information to the reproduction unit 85.

<Description on Imaging Processing>

Figure 19:
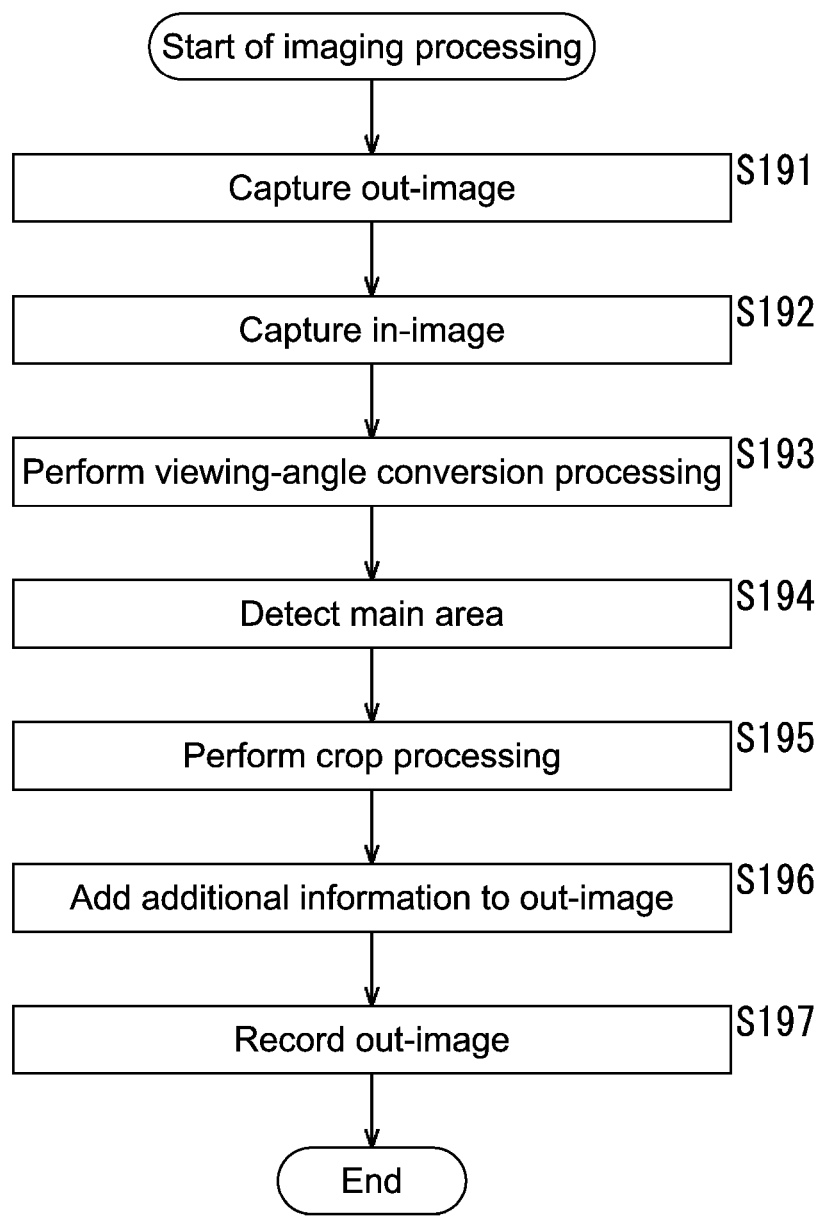
FIG. 19 is a flowchart for describing imaging processing.

Next, with reference to the flowchart of FIG. 19, description will be given on imaging processing performed by the image processing apparatus 11 when the signal processing unit 53 has the configuration shown in FIG. 18.

Since processing of Steps S191 and S192 are similar to the processing of Steps S11 and S12 of FIG. 5, description thereof will be omitted.

In Step S193, the viewing-angle converting unit 181 performs viewing-angle conversion processing on the out-image supplied from the out-image capturing unit 23, based on a specified out-side aspect parameter, and supplies the resultant image to the additional processing unit 82.

For example, the viewing-angle converting unit 181 converts the viewing angle of the out-image by seam carving processing. In the seam carving processing, a path in the vertical direction in which the cost becomes the lowest is calculated until the aspect ratio of the out-image reaches an aspect ratio indicated by the out-side aspect parameter, and processing of thinning out pixels on the path is repeated. In other words, the thinning-out of the pixels is performed such that a change of a pattern from the original image becomes the least.

Consequently, the image T11 shown in FIG. 17, for example, is obtained as a final out-image and supplied to the additional processing unit 82.

It should be noted that the example of the seam carving processing has been described as the viewing-angle conversion processing in which the viewing angle of the out-image is converted, but processing of contracting an image may be performed as the viewing-angle conversion processing.

In Step S194, the main-area detecting unit 182 detects a main area from the in-image supplied from the in-image capturing unit 22, and supplies a result of the detection and the in-image to the crop processing unit 183. For example, face recognition processing is performed on the in-image, and an area of a human face in the in-image is obtained as a main area.

In Step S195, the crop processing unit 183 performs crop processing on the in-image supplied from the main-area detecting unit 182, based on the result of the detection on the main area supplied from the main-area detecting unit 182 and on a specified in-side aspect parameter.

In other words, the crop processing unit 183 cuts out an area including the main area in the in-image and having an aspect ratio indicated by the in-side aspect parameter to obtain a cropped image, and supplies the cropped image to the additional processing unit 82. Consequently, the image C11 shown in FIG. 17, for example, is obtained as a cropped image. The cropped image thus obtained is the additional information of the out-image.

In Step S196, the additional processing unit 82 adds the cropped image, which is supplied from the crop processing unit 183 and serves as additional information, to the image data of the out-image supplied from the viewing-angle converting unit 181, and supplies the resultant image to the recording unit 54.

In Step S197, the recording unit 54 records the out-image supplied from the additional processing unit 82, and the imaging processing is terminated.

As described above, the image processing apparatus 11 obtains a cropped image as additional information, the cropped image being obtained by cutting out an area including the main area of the in-image, and adds the cropped image to the out-image. In such a manner, the cropped image as additional information is embedded in the out-image, and thus it is possible to display only an out-image or combine the cropped image with the out-image for display. Consequently, it is possible to more effectively display the out-image and also improve convenience.

<Description on Reproduction Processing>

Additionally, when the out-image is recorded in the recording unit 54, the user can operate the operation input unit 51 to display the out-image. At that time, the user operates the operation input unit 51, for example, and can thus select whether to display only the out-image or whether to combine the cropped image as additional information with the out-images for display.

Figure 20:
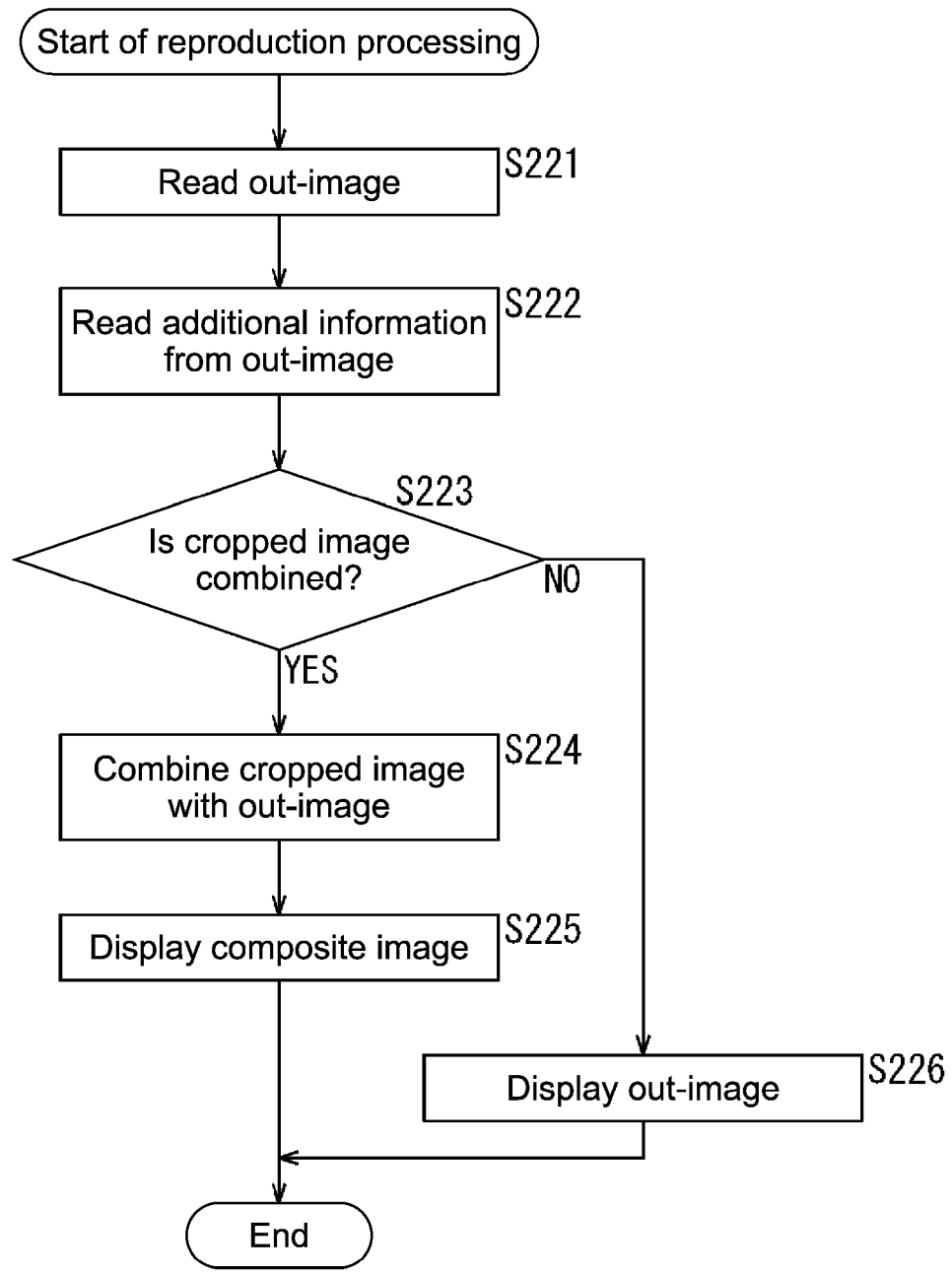
FIG. 20 is a flowchart for describing reproduction processing.

Hereinafter, with reference to a flowchart of FIG. 20, description will be given on reproduction processing performed by the image processing apparatus 11 when the user gives an instruction to reproduce the out-image.

In Step S221, the extraction unit 83 reads the out-image from the recording unit 54, the out-image being specified by the user according to an instruction of the control unit 52.

In Step S222, the extraction unit 83 reads the cropped image as additional information from the image data of the out-image and supplies the cropped image and the out-image to the reproduction unit 85.

In Step S223, the reproduction unit 85 determines whether to combine the cropped image with the out-image or not.

When it is determined in Step S223 that the cropped image is combined, in Step S224, the combining unit 95 combines the cropped image with the out-image supplied from the extraction unit 83. Specifically, the combining unit 95 arranges the out-image and the cropped image and performs weighted addition processing of the out-image and the cropped image in areas adjacent to the boundary of those images, to generate one composite image. Consequently, the composite image P21 shown in FIG. 17, for example, is obtained.

Here, a weight used in the weighted addition processing is determined such that a position closer to the out-image side has a greater weight of the out-image, for example. More specifically, in the case where the weighted addition processing is performed, the size of the out-image and that of the cropped image are increased by a proportion corresponding to an area required for the weighted addition processing, and a composite image eventually obtained has the same aspect ratio as the original out-image.

When the composite image is obtained in such a manner, the reproduction unit 85 supplies the composite image to the display unit 21.

In Step S225, the display unit 21 displays the composite image supplied from the reproduction unit 85, and the reproduction processing is terminated.

Additionally, when it is determined in Step S223 that the cropped image is not combined, the reproduction unit 85 supplies the out-image as it is to the display unit 21, the out-image being supplied from the extraction unit 83, and the processing proceeds to Step S226.

In Step S226, the display unit 21 displays the out-image supplied from the reproduction unit 85, and the reproduction processing is terminated.

As described above, the image processing apparatus 11 displays the out-image as it is or combines the cropped image with the out-image for display, the cropped image being added as additional information, according to the instruction of the user.

If the additional information added to the out-image is used in such a manner, it is possible to display a desired image out of the out-image and the composite image. In other words, it is possible to more effectively display the out-image and provide more enjoyment to the user when viewing the out-image.

Fifth Embodiment

<Configuration Example of Signal Processing Unit>

In the second embodiment described above, the example in which the photographer information as additional information is added to the out-image has been described, but a recording area for the out-image may be determined according to the photographer information as additional information.

Figure 21:
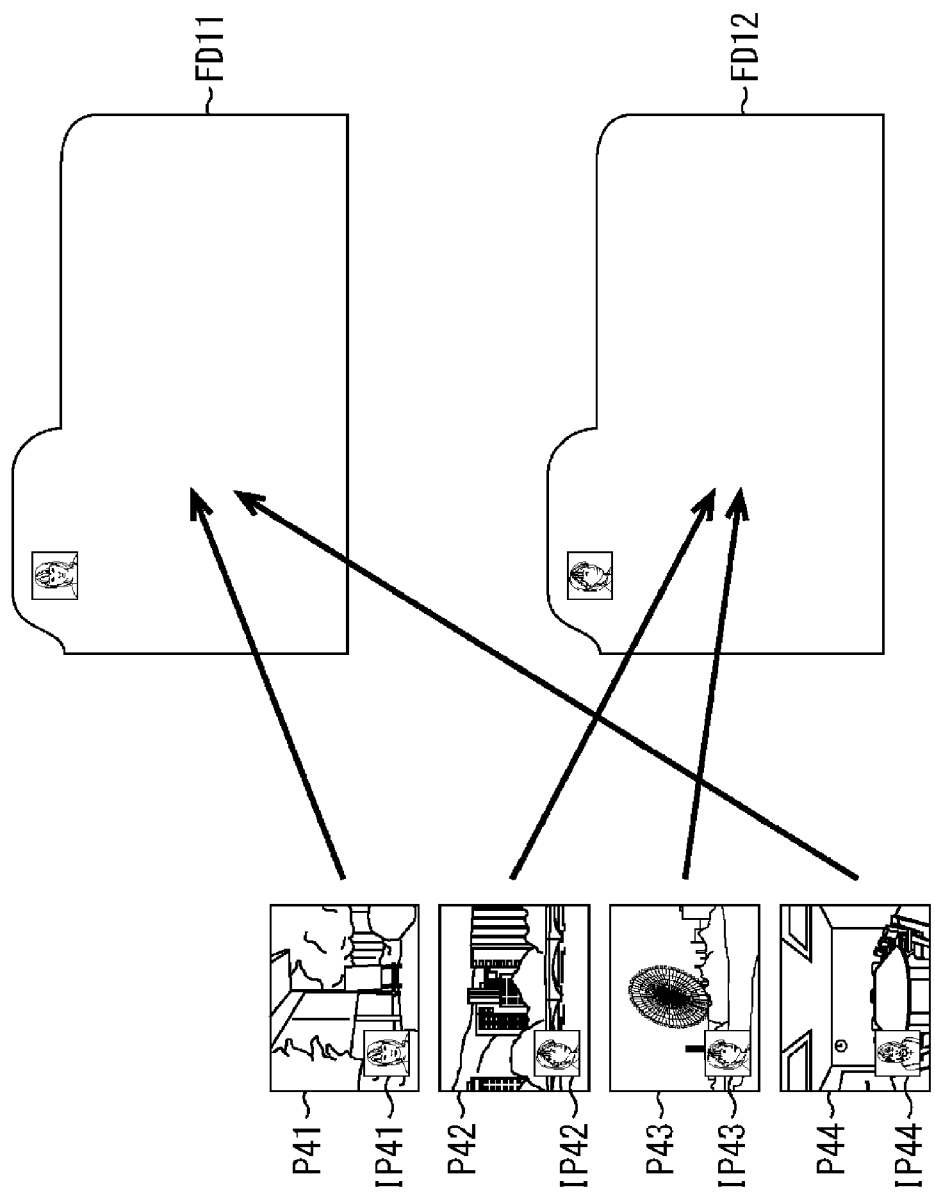
FIG. 21 is a diagram for describing recording of out-images on a photographer basis.

For example, as shown in FIG. 21, it is assumed that four out-images P41 to P44 are captured, and photographer information are obtained as additional information of those out-images. In this example, when the out-images P41 to P44 are reproduced, binary images IP41 to IP44 are combined with the out-images P41 to P44 for display as necessary.

In the case where the out-images P41 to P44 are obtained in such a manner, those out-images are recorded in folders on a photographer basis, the photographers being indicated by the pieces of photographer information of the out-images.

For example, as shown on the right side in the figure, the recording unit 54 is provided in advance with a folder FD11 of a photographer A and a folder FD12 of a photographer B.

It is assumed that the photographer information added as additional information to the out-images P41 and P44 is information indicating the photographer A, and the photographer information added as additional information to the out-images P42 and P43 is information indicating the photographer B. In such a case, the out-images P41 and P44 are recorded in the folder FD11 and the out-images P42 and P43 are recorded in the folder FD12.

Figure 22:
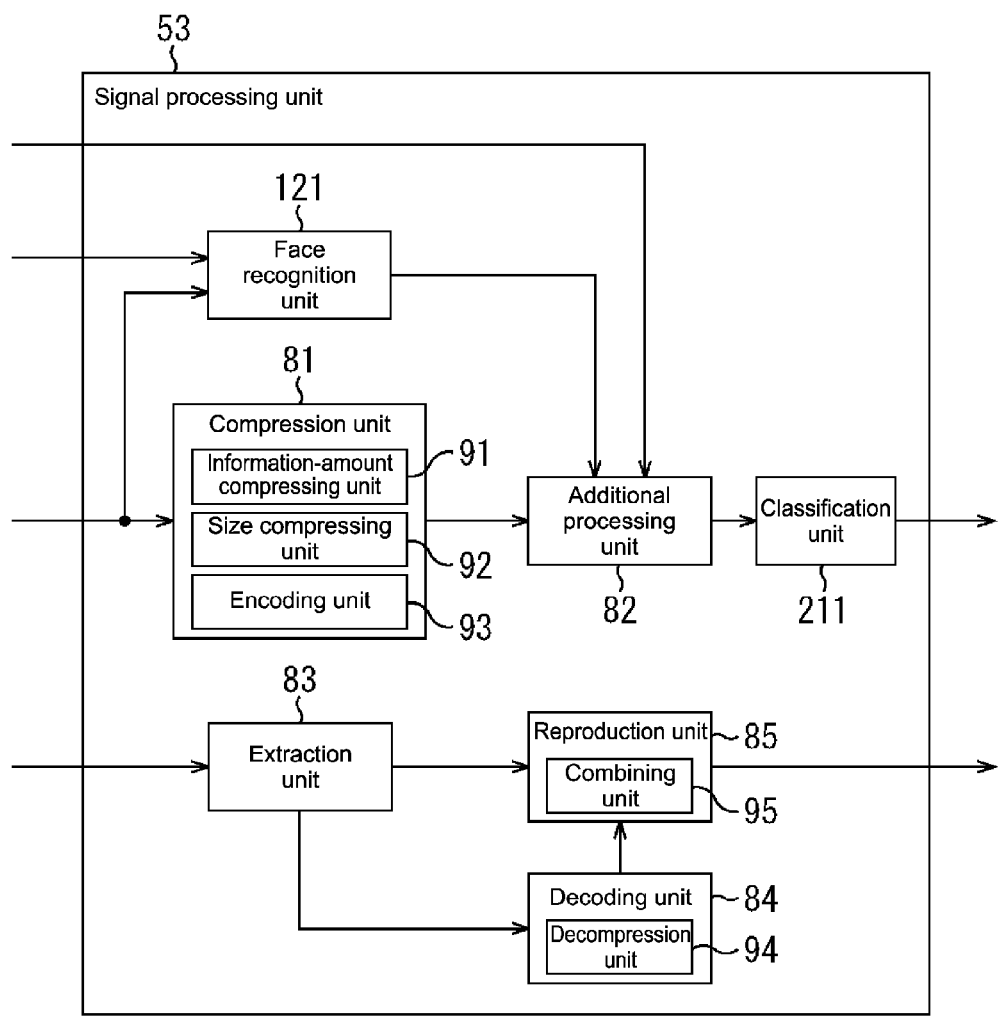
FIG. 22 is a diagram showing a configuration example of the signal processing unit.

In such a manner, in the case where the out-images are recorded in the folders on a photographer basis as recording areas determined by the photographer information, the signal processing unit 53 has a configuration shown in FIG. 22, for example. In FIG. 22, the same reference numerals are given to portions corresponding to the portions in FIG. 8 and description thereof will be appropriately omitted.

The signal processing unit 53 shown in FIG. 22 includes a compression unit 81, an additional processing unit 82, an extraction unit 83, a decoding unit 84, a reproduction unit 85, a face recognition unit 121, and a classification unit 211. In other words, the signal processing unit 53 of FIG. 22 has a configuration in which the signal processing unit 53 of FIG. 8 further includes the classification unit 211.

The classification unit 211 supplies the out-image from the additional processing unit 82 to the recording unit 54 for recording so as to be stored in a folder determined by the photographer information added as additional information to the out-image, out of the folders of the recording unit 54.

<Description on Imaging Processing>

Next, with reference to a flowchart of FIG. 23, description will be given on imaging processing performed when the signal processing unit 53 has the configuration shown in FIG. 22.

Figure 9:
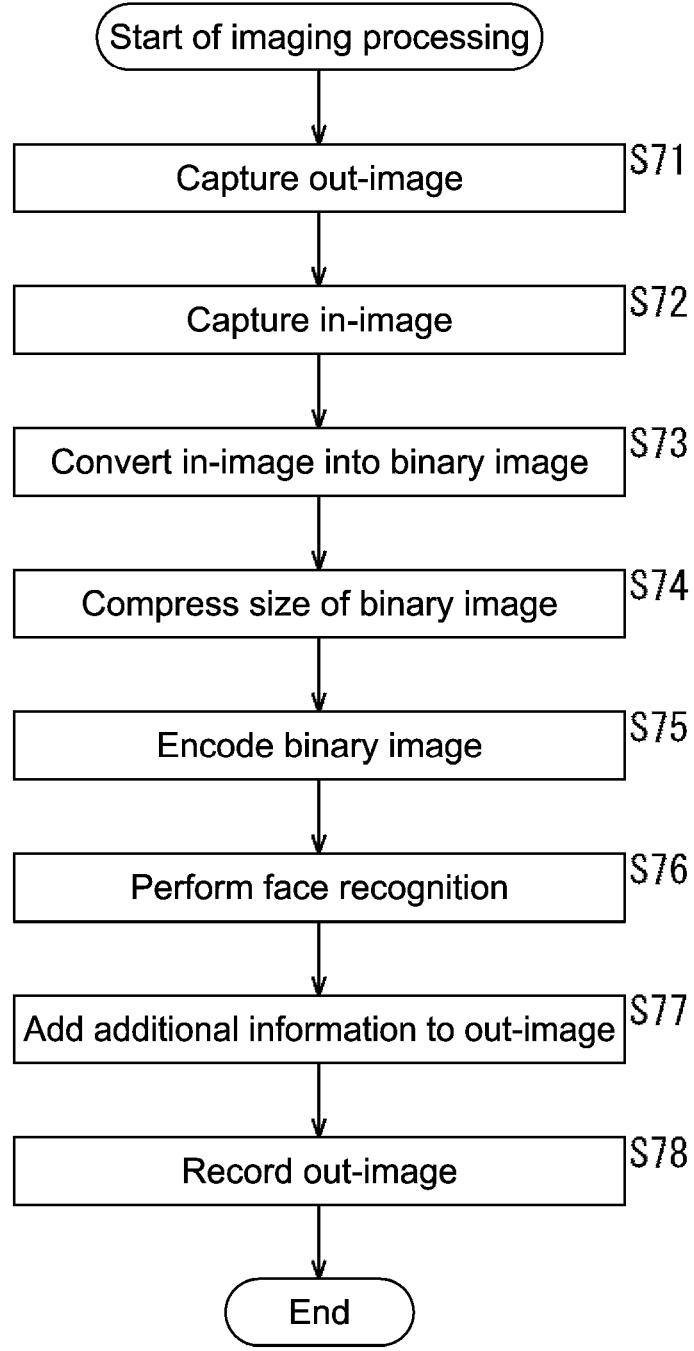
FIG. 9 is a flowchart for describing imaging processing.

Since processing of Steps S251 to S257 are similar to the processing of Steps S71 to S77 of FIG. 9, description thereof will be omitted. In Step S257, however, the image data of the out-image, to which the photographer information and the encoded binary image are added as additional information, is supplied from the additional processing unit 82 to the classification unit 211.

In Step S258, the classification unit 211 records the out-image in the recording unit 54 according to the additional information of the out-image supplied from the additional processing unit 82, and the imaging processing is terminated.

Specifically, the photographer information is associated with each of the folders provided in the recording unit 54, for example. The classification unit 211 identifies a folder with which the same photographer information as the photographer information added to the out-image is associated. The classification unit 211 supplies the out-image to the recording unit 54 so as to be stored in the identified folder and then recorded therein. In other words, the out-image is recorded in the recording area of the recording unit 54, the recording area being assumed as the area of the identified folder.

As described above, the image processing apparatus 11 adds the binary image and the photographer information, which are obtained as additional information from the in-image, to the out-image, and records the out-image in the folder determined by the photographer information.

Consequently, it is possible to more effectively display the out-image and also improve convenience. For example, if the photographer information generated as additional information is used, it is possible to effectively display the out-image, for example, to display a list of out-images captured by a specific photographer. In addition, since the out-images are recorded in the folders on a photographer basis according to the photographer information at the time when the out-images are recorded, the out-images of a specific photographer can be quickly identified.

<Description on Reproduction Processing>

Additionally, when the out-image is recorded in the recording unit 54, the user can operate the operation input unit 51 to display a list of out-images captured by a specific user. At that time, the user operates the operation input unit 51, for example, and can thus select whether to display only out-images or whether to combine images, which are obtained from additional information, with the out-images for display.

Figure 24:
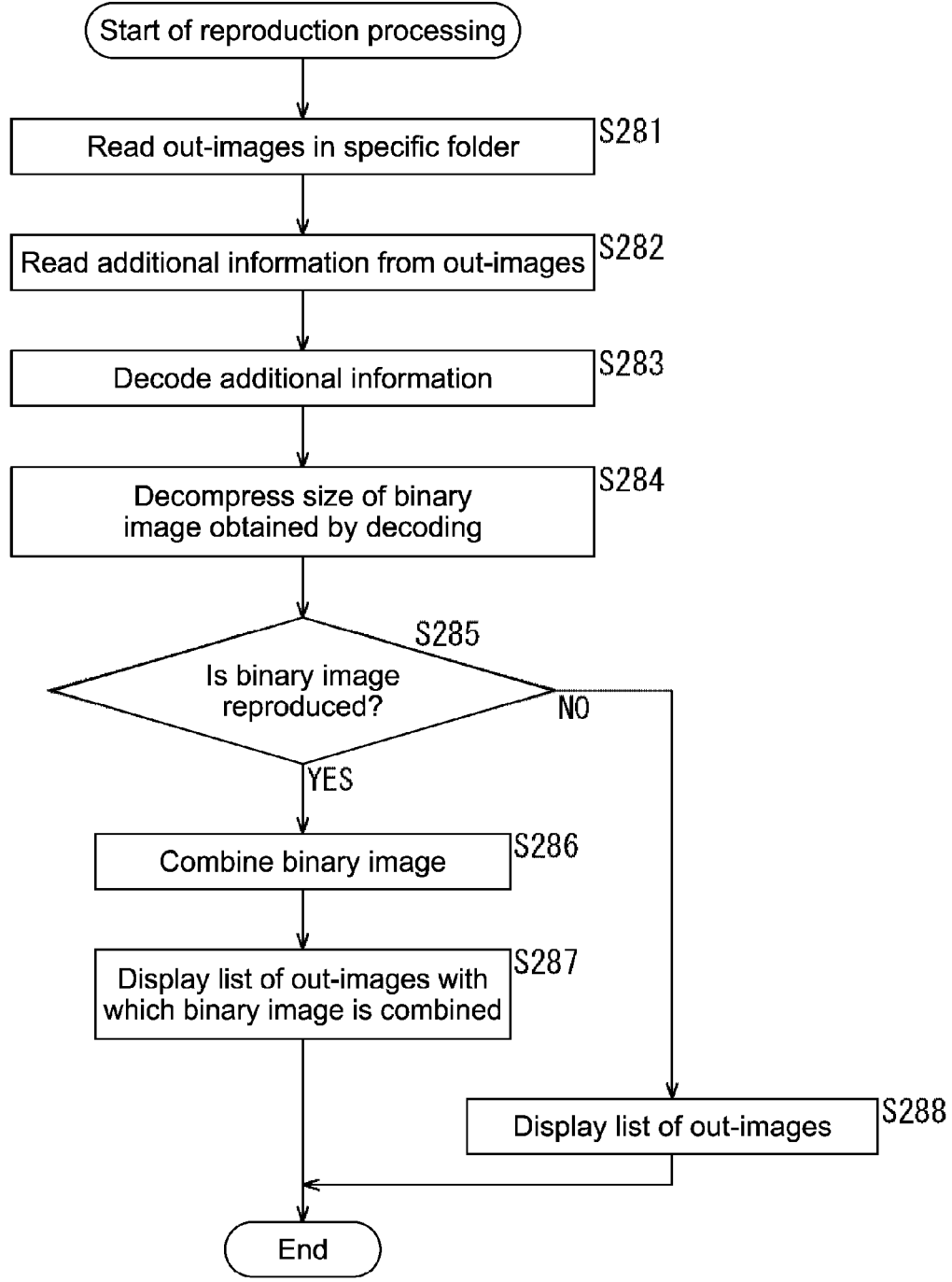
FIG. 24 is a flowchart for describing reproduction processing.

Hereinafter, with reference to a flowchart of FIG. 24, description will be given on reproduction processing performed by the image processing apparatus 11 when the user gives an instruction to display a list of out-images.

In Step S281, the extraction unit 83 reads all out-images recorded in a specific folder of the recording unit 54. For example, the extraction unit 83 reads out-images that are stored in a folder of any user (photographer) specified by the user operating the operation input unit 51.

Additionally, for example, the extraction unit 83 may read an out-image that is stored in a folder of a user (photographer) logging in the image processing apparatus 11. Further, it may be possible to capture an in-image by the in-image capturing unit 22, perform face recognition by the face recognition unit 121, and read an out-image stored in a folder of a user identified as a result of the face recognition, that is, a user operating the image processing apparatus 11.

After the out-images are read in such a manner, processing of Steps S282 to S288 are performed, and the reproduction processing is terminated. Since those processing are similar to the processing of Steps S103 to S109 in FIG. 10, description thereof will be omitted.

As described above, the image processing apparatus 11 reads the out-images from the folders that are provided on a photographer basis, the photographers being indicated by the photographer information added to the out-images as additional information, to display a list of the out-images. Additionally, the image processing apparatus 11 combines the binary images with the out-images for display according to an instruction of the user, when the out-images are displayed in a list.

If the photographer information added to the out-image as additional information is used in such a manner, it is possible to more effectively display the out-images, for example, to display only the out-images of a specific photographer. Additionally, if the out-image is stored in a folder that is determined by the photographer information as additional information, an out-image of a specific photographer can be identified more easily and quickly, which improves convenience.

Sixth Embodiment

<Configuration Example of Signal Processing Unit>

A smile of a user operating the image processing apparatus 11 may be detected to capture an out-image and an in-image at a timing when the smile is detected, and the degree of smile of the user may be added to the out-image as additional information.

Figure 25:
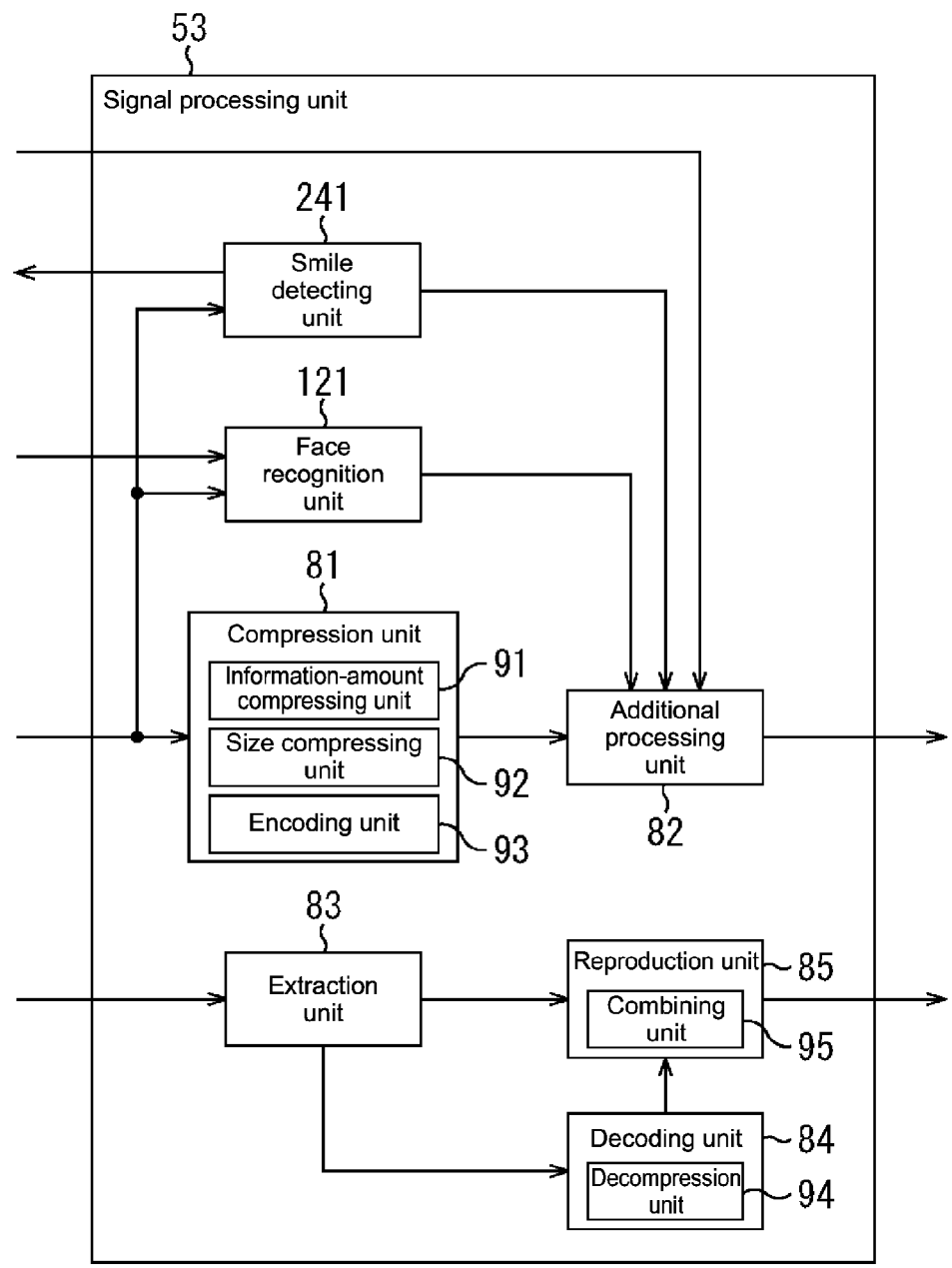
FIG. 25 is a diagram showing a configuration example of the signal processing unit.

In such a case, the signal processing unit 53 has, for example, a configuration shown in FIG. 25. In FIG. 25, the same reference numerals are given to portions corresponding to the portions in FIG. 8 and description thereof will be appropriately omitted.

The signal processing unit 53 shown in FIG. 25 includes a compression unit 81, an additional processing unit 82, an extraction unit 83, a decoding unit 84, a reproduction unit 85, a face recognition unit 121, and a smile detecting unit 241. In other words, the signal processing unit 53 of FIG. 25 has a configuration in which the signal processing unit 53 of FIG. 8 further includes the smile detecting unit 241.

The smile detecting unit 241 detects a smile of a user who operates the image processing apparatus 11, that is, a user as a photographer of the out-image, from the in-image supplied from the in-image capturing unit 22. The smile detecting unit 241 supplies information to the control unit 52 according to a result of the detection, the information indicating that an imaging timing has come. The control unit 52 controls the out-image capturing unit 23 and the in-image capturing unit 22 to capture an out-image and an in-image according to the information indicating that an imaging timing has come, the information being supplied from the smile detecting unit 241.

Additionally, the smile detecting unit 241 generates the degree of smile of the user, the degree of smile being detected from the in-image and serving as additional information, and supplies the additional information to the additional processing unit 82.

<Description on Imaging Processing>

Next, with reference to a flowchart of FIG. 26, description will be given on imaging processing performed when the signal processing unit 53 has the configuration shown in FIG. 25. In this case, the user operates the operation input unit 51, and when the user gives an instruction to capture an out-image, imaging processing is started.

In Step S311, the in-image capturing unit 22 captures an in-image according to an instruction of the control unit 52 and supplies the in-image to the compression unit 81, the face recognition unit 121, and the smile detecting unit 241.

In Step S312, the smile detecting unit 241 detects a smile of the user from the in-image supplied from the in-image capturing unit 22.

For example, the smile detecting unit 241 holds learning data of a large number of smiles determined in advance. Here, the learning data refers to, for example, image data of human faces having facial expressions such as a faint smile and a loud laughter, regardless of specific smiles.

The smile detecting unit 241 compares a feature amount obtained from each piece of the learning data with a feature amount obtained from the in-image to calculate a score value, and thus calculates the degree of smile of the user on the in-image. At that time, the degree of similarity to the in-image is considered as the degree of smile of the user on the in-image. Additionally, for example, in the case where the degree of smile has a specific value or more, it is considered that a smile is detected from the in-image.

It should be noted that a method of detecting a smile may be any method as long as a smile can be detected from the in-image. For example, the smile detecting unit 241 may hold learning data on a degree-of-smile basis, for a plurality of degrees of smile determined in advance. Here, the learning data refers to, for example, image data of an average human smile, which is a specific degree of smile, that is, image data of an average human face having specific facial expressions such as a faint smile and a loud laughter.

The smile detecting unit 241 compares a feature amount obtained from each piece of the learning data with a feature amount obtained from the in-image and identifies learning data that is the most similar to the in-image from the pieces of the learning data, to calculate the degree of smile of the user on the in-image. At that time, in the case where there is learning data in which the degree of similarity to the in-image is a specific value or more, it is considered that a smile is detected from the in-image and that the degree of smile in the learning data having the highest degree of similarity is considered as the degree of smile of the user on the in-image.

In Step S313, the smile detecting unit 241 determines whether a smile is detected from the in-image or not.

When it is determined in Step S313 that a smile is not detected, the processing returns to Step S311, and the processing described above is repeated.

In contrast to this, when it is determined in Step S313 that a smile is detected, the smile detecting unit 241 supplies information to the control unit 52, the information indicating that an imaging timing has come, and the processing proceeds to Step S314. Additionally, the smile detecting unit 241 supplies the degree of smile of the user on the in-image to the additional processing unit 82, the degree of smile being obtained by smile detection and serving as additional information.

It should be noted that here, the degree of smile as additional information of an out-image is information indicating a smile (facial expression) of a photographer who captures the out-image. Additionally, in calculation of the degree of smile in the smile detecting unit 241, the mouth shape, the size of a teeth area, and the like in the user's face that are detected from the in-image may be used.

After a smile is detected from the in-image, processing of Steps S314 to S319 are performed. Since those processing are similar to the processing of Steps S71 to S76 in FIG. 9, description thereof will be omitted. In Steps S314 and S315, however, the control unit 52 causes the out-image capturing unit 23 and the in-image capturing unit 22 to capture an out-image and an in-image based on information indicating that an imaging timing has come, the information being supplied from the smile detecting unit 241. In other words, an out-image and an in-image are captured at the timing when the smile of the photographer is detected.

In Step S320, the additional processing unit 82 obtains, as additional information, the photographer information from the face recognition unit 121, the encoded binary image from the compression unit 81, and the degree of smile from the smile detecting unit 241, and adds the additional information to the image data of the out-image from the out-image capturing unit 23. The additional processing unit 82 then supplies the image data of the out-image, to which the additional information is added, to the recording unit 54.

In Step S321, the recording unit 54 records the out-image supplied from the additional processing unit 82, and the imaging processing is terminated.

As described above, the image processing apparatus 11 adds the binary image, the photographer information, and the degree of smile, which are obtained as additional information from the in-image, to the out-image.

Consequently, it is possible to more effectively display the out-image and also improve convenience. For example, if the degree of smile is used as additional information, it is possible to selectively display an out-image in which a photographer has a specific facial expression, that is, a specific degree of smile, at the time when the image is captured. Additionally, if the degree of smile is obtained as additional information, an out-image in a specific degree of smile can be detected more easily and quickly, which improves convenience.

<Description on Reproduction Processing>

Additionally, when the out-image is recorded in the recording unit 54, the user can operate the operation input unit 51 to display out-images with a specific degree of smile in a slide show or in a list. At that time, the user operates the operation input unit 51, for example, and can thus select whether to display only out-images or whether to combine images, which are obtained from additional information, with the out-images for display.

Figure 27:
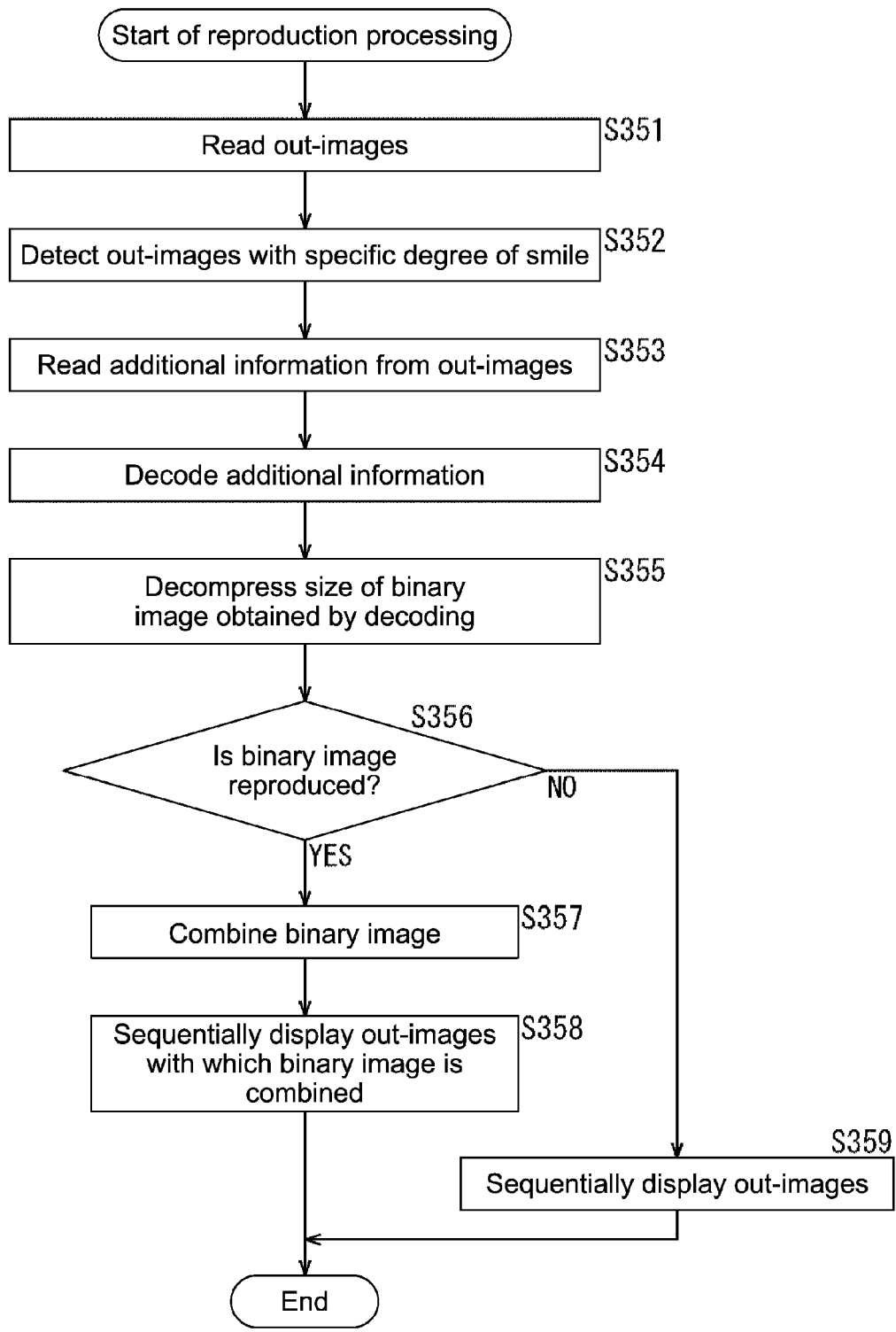
FIG. 27 is a flowchart for describing reproduction processing.

Hereinafter, with reference to a flowchart of FIG. 27, description will be given on reproduction processing performed by the image processing apparatus 11 when the user gives an instruction to display out-images in a slide show.

In Step S351, the extraction unit 83 reads all out-images recorded in the recording unit 54.

In Step S352, the extraction unit 83 reads the degree of smile as additional information, which is added to each of the read out-images, and detects out-images with a specific degree of smile. For example, a specific degree of smile is specified in advance by the user.

After out-images with a specific degree of smile are detected, the processing of Steps S353 to S357 are performed. Since those processing are similar to the processing of Steps S103 to S107 in FIG. 10, description thereof will be omitted. In Step S353, however, the additional information is read from each of the out-images with the specific degree of smile, and those out-images are supplied to the reproduction unit 85. Additionally, the reproduction unit 85 sequentially supplies the out-images, with which the binary images are combined, to the display unit 21.

In Step S358, the display unit 21 sequentially displays the out-images, with which the binary images are combined and which are supplied from the reproduction unit 85, and the reproduction processing is terminated.

In contrast to this, when it is determined in Step S356 that the binary image are not reproduced, the reproduction unit 85 supplies the out-images, which are supplied from the extraction unit 83, to the display unit 21 as they are, and the processing proceeds to Step S359.

In Step S359, the display unit 21 sequentially displays the out-images supplied from the reproduction unit 85, and the reproduction processing is terminated.

As described above, the image processing apparatus 11 detects and displays the out-images with a specific degree of smile, using the degree of smile added to the out-images as additional information. Additionally, when the out-images are displayed, the image processing apparatus 11 combines the binary image with each out-image for display, according to a user's instruction.

If the degree of smile as additional information added to the out-image is used in such a manner, it is possible to more effectively display the out-image, for example, to display only the out-image captured when the photographer has a specific facial expression.

Seventh Embodiment

<Configuration Example of Signal Processing Unit>

Although the example in which the degree of smile is added as additional information of the out-image has been described hereinabove, a recording area for the out-image may be determined according to the degree of smile as additional information.

Figure 28:
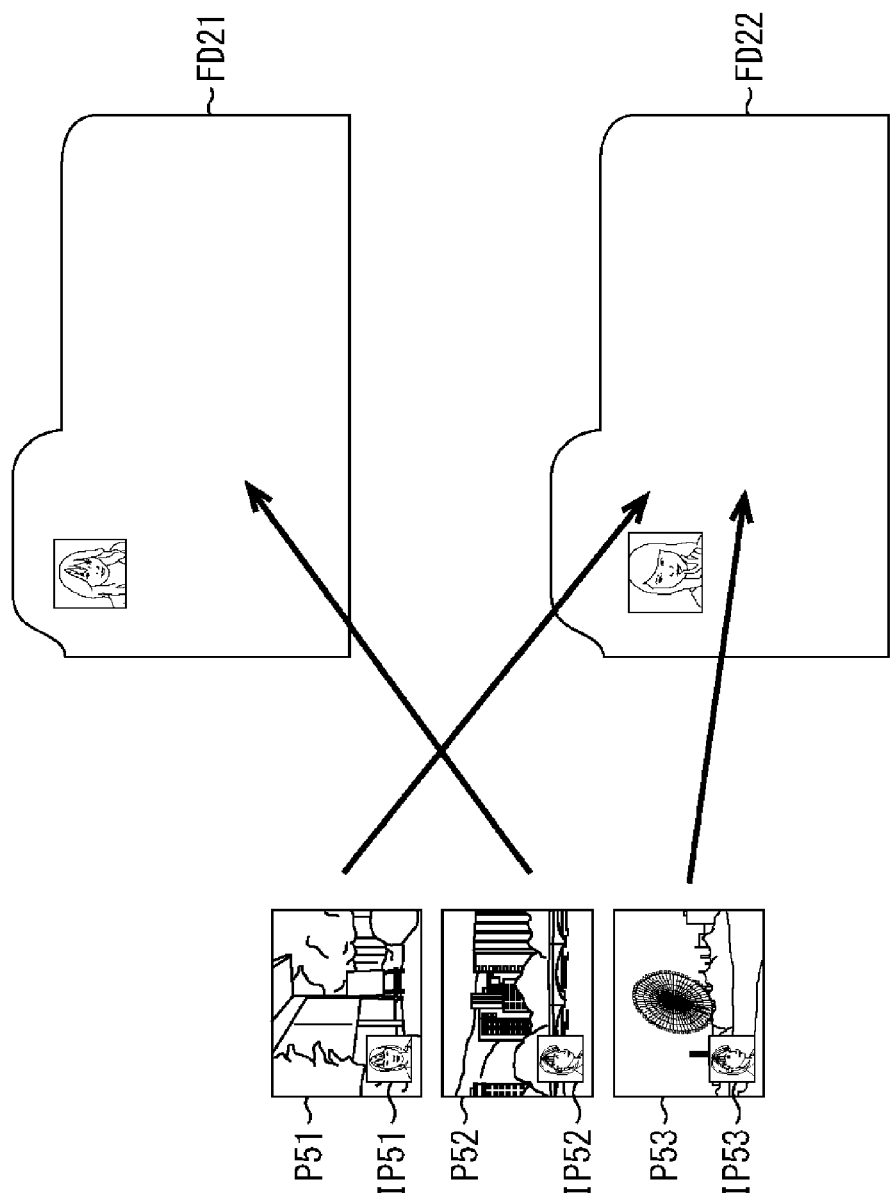
FIG. 28 is a diagram for describing recording of out-images on a degree-of-smile basis.

For example, as shown in FIG. 28, it is assumed that three out-images P51 to P53 are captured, and the degrees of smile are obtained as additional information of those out-images. In this example, when the out-images P51 to P53 are reproduced, binary images IP51 to IP53 are combined with the out-images P51 to P53 for display as necessary.

In the case where the out-images P51 to P53 are obtained in such a manner, those out-images are recorded in folders on a degree-of-photographer's smile basis.

For example, as shown on the right side in the figure, the recording unit 54 is provided in advance with a folder FD21 of the degree of smile A and a folder FD22 of the degree of smile B.

It is assumed that the degree of smile added as additional information to the out-images P51 and P53 is information indicating the degree of smile B, and the degree of smile added as additional information to the out-image P52 is information indicating the degree of smile A. In such a case, the out-image P52 is recorded in the folder FD21, and the out-images P51 and P53 are recorded in the folder FD22.

Figure 29:
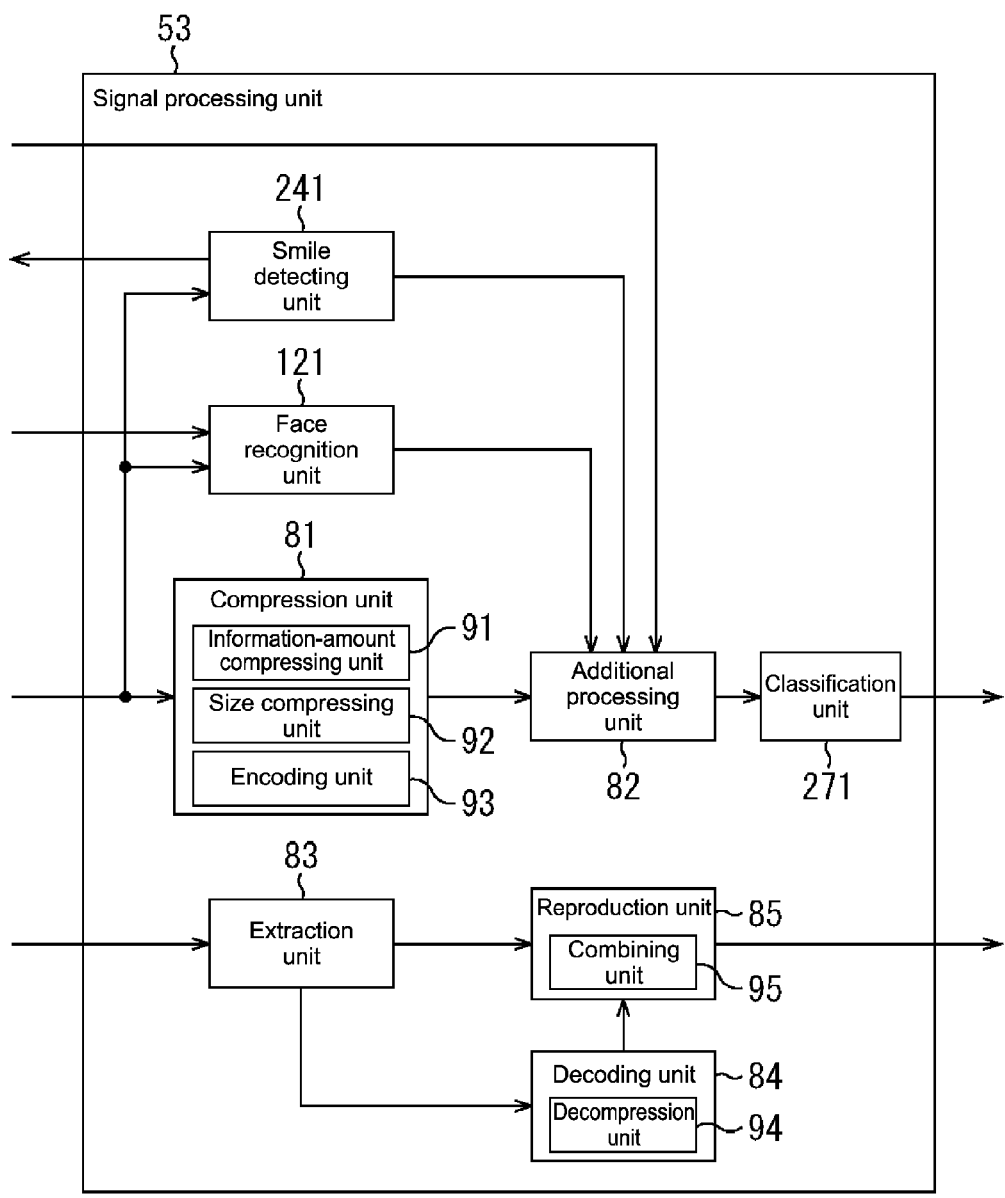
FIG. 29 is a diagram showing a configuration example of the signal processing unit.

In such a manner, in the case where the out-images are recorded in the folders on a degree-of-smile basis as recording areas determined by the degrees of smile of the photographers, the signal processing unit 53 has a configuration shown in FIG. 29, for example. In FIG. 29, the same reference numerals are given to portions corresponding to the portions in FIG. 25 and description thereof will be appropriately omitted.

The signal processing unit 53 shown in FIG. 29 includes a compression unit 81, an additional processing unit 82, an extraction unit 83, a decoding unit 84, a reproduction unit 85, a face recognition unit 121, a smile detecting unit 241, and a classification unit 271. In other words, the signal processing unit 53 of FIG. 29 has a configuration in which the signal processing unit 53 of FIG. 25 further includes the classification unit 271.

The classification unit 271 supplies the out-image from the additional processing unit 82 to the recording unit 54 for recording so as to be stored in a folder determined by the degree of smile added as additional information to the out-image, out of the folders of the recording unit 54.

<Description on Imaging Processing>

Figure 30:
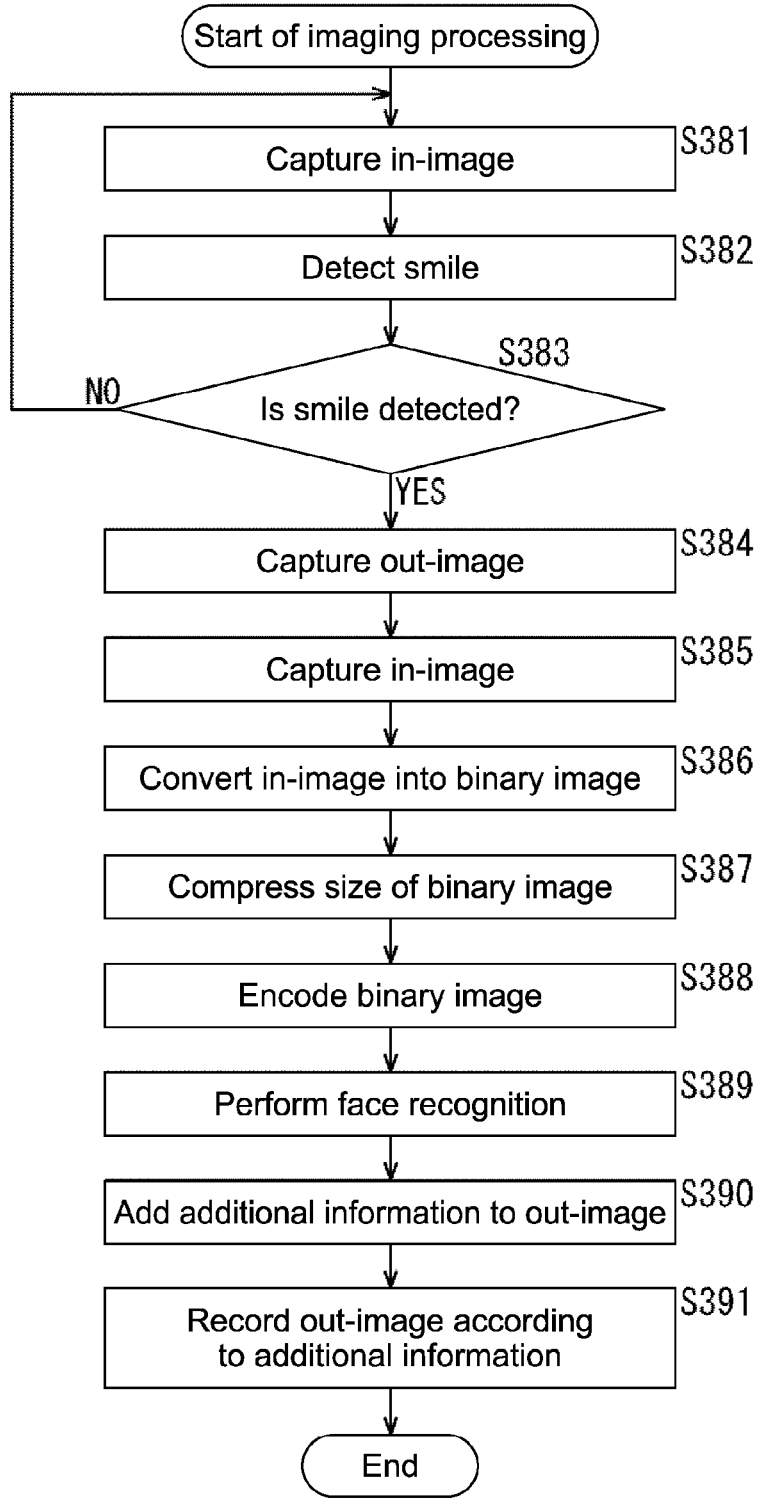
FIG. 30 is a flowchart for describing imaging processing.

Next, with reference to a flowchart of FIG. 30, description will be given on imaging processing performed when the signal processing unit 53 has the configuration shown in FIG. 29.

Figure 26:
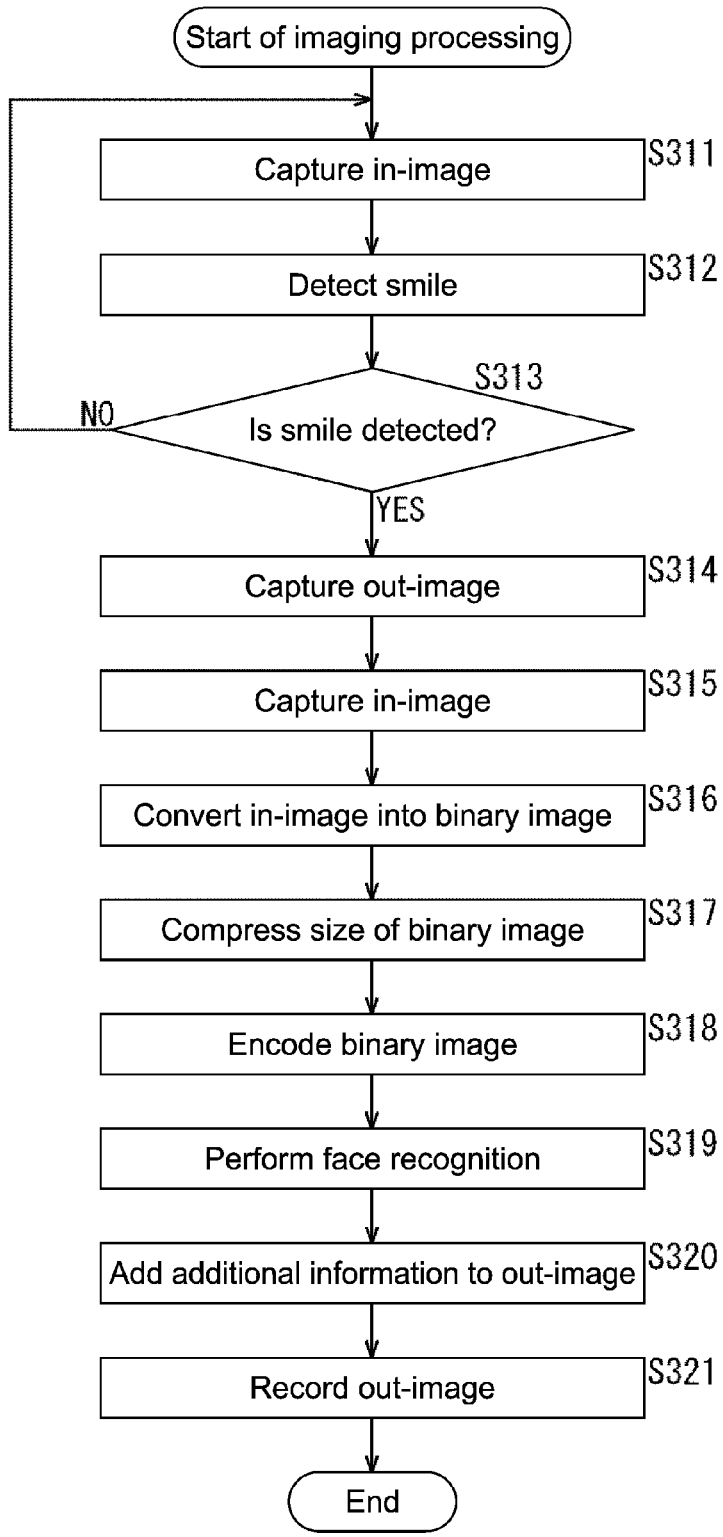
FIG. 26 is a flowchart for describing imaging processing.

Since processing of Steps S381 to S390 are similar to the processing of Steps S311 to S320 of FIG. 26, description thereof will be omitted. In Step S390, however, the image data of the out-image, to which the photographer information, the encoded binary image, and the degree of smile are added as additional information, is supplied from the additional processing unit 82 to the classification unit 271.

In Step S391, the classification unit 271 records the out-image in the recording unit 54 according to the additional information of the out-image supplied from the additional processing unit 82, and the imaging processing is terminated.

Specifically, the degree of smile is associated with each of the folders provided in the recording unit 54, for example. The classification unit 271 identifies a folder with which the same degree of smile as the degree of smile added to the out-image is associated. The classification unit 271 then supplies the out-image to the recording unit 54 so as to be stored in the identified folder and then recorded therein. In other words, the out-image is recorded in the recording area of the recording unit 54, the recording area being assumed as the area of the identified folder.

As described above, the image processing apparatus 11 adds the binary image, the photographer information, and the degree of smile, which are obtained as additional information from the in-image, to the out-image, and records the out-image in the folder determined by the degree of smile.

Consequently, it is possible to more effectively display the out-image and also improve convenience. For example, if the degree of smile generated as additional information is used, it is possible to effectively display the out-image, for example, to display the out-image captured in a specific facial expression. In addition, since the out-images are recorded in folders on a photographer's facial expressions basis according to the degree of smile at the time when the out-images are recorded, the out-images of a specific degree of smile can be quickly identified, which improves convenience.

It should be noted that the example in which the folders are provided on a degree-of-smile basis regardless of the photographers has been described here, but the folders may be provided on a degree-of-smile basis for each photographer. In such a case, the out-images are stored in the folders determined by the photographer information and the degree of smile of the out-images.

<Description on Reproduction Processing>

Additionally, when the out-image is recorded in the recording unit 54, the user can operate the operation input unit 51 to display the out-image captured by a user having a specific facial expression or display out-images in a list. At that time, the user operates the operation input unit 51, for example, and can thus select whether to display only out-images or whether to combine images, which are obtained from the additional information, with the out-images for display.

Figure 31:
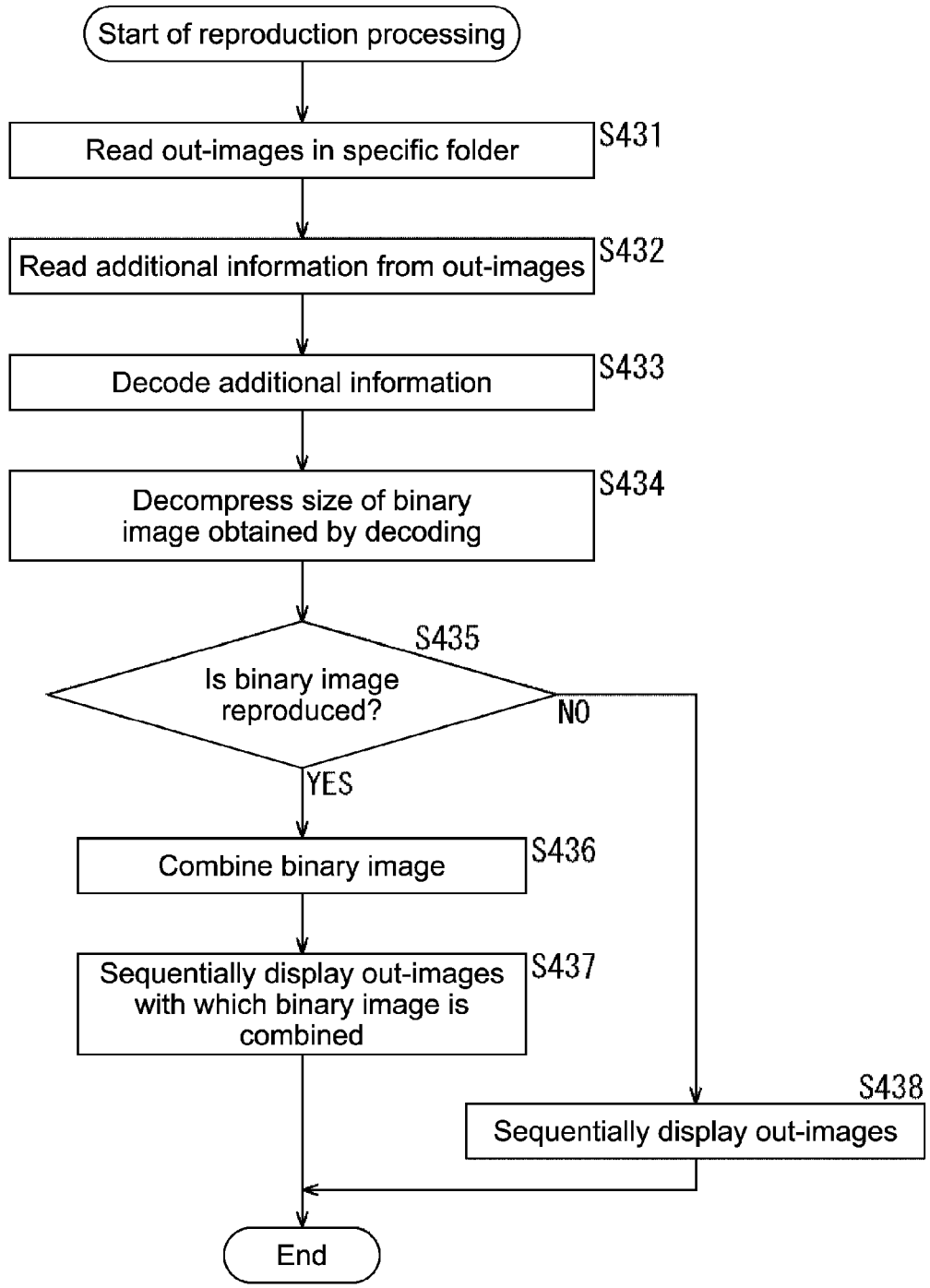
FIG. 31 is a flowchart for describing reproduction processing.

Hereinafter, with reference to a flowchart of FIG. 31, description will be given on reproduction processing performed by the image processing apparatus 11 when the user gives an instruction to display an out-image.

In Step S431, the extraction unit 83 reads all out-images recorded in a specific folder of the recording unit 54. For example, the extraction unit 83 reads out-images that are stored in a folder of any degree of smile specified by the user operating the operation input unit 51.

After the out-images are read in such a manner, the processing of Steps S432 and S438 are performed, and the reproduction processing is terminated. Since those processing are similar to the processing of Steps S353 to S359 in FIG. 27, description thereof will be omitted.

As described above, the image processing apparatus 11 reads the out-images from the folders that are provided on a photographer's facial expressions basis indicated by the degree of smile, the degree of smile being added as additional information to the out-images, to display the out-images. Additionally, the image processing apparatus 11 combines the binary images with the out-images for display according to an instruction of the user, when the out-images are displayed.

In such a manner, if the degree of smile as additional information added to the out-image is used, it is possible to more effectively display the out-image, for example, to display only the out-image captured when the photographer has a specific facial expression. Additionally, if the out-image is stored in a folder that is determined by the degree of smile as additional information, an out-image of a specific degree of smile can be identified more easily and quickly, which improves convenience.

Eighth Embodiment

<Description on Imaging Processing>

In the seventh embodiment described above, the example in which an out-image is captured when a smile is detected from the in-image has been described, but an out-image and an in-image may be captured according to a user's instruction and the out-image may be recorded in a folder corresponding to the degree of smile.

In such a case, the signal processing unit 53 has a configuration shown in FIG. 29, for example. In this example, however, information indicating that an imaging timing has come is not provided from the smile detecting unit 241 to the control unit 52. The control unit 52 instructs the out-image capturing unit 23 and the in-image capturing unit 22 to capture an out-image and an in-image according to an operation on the operation input unit 51.

Figure 32:
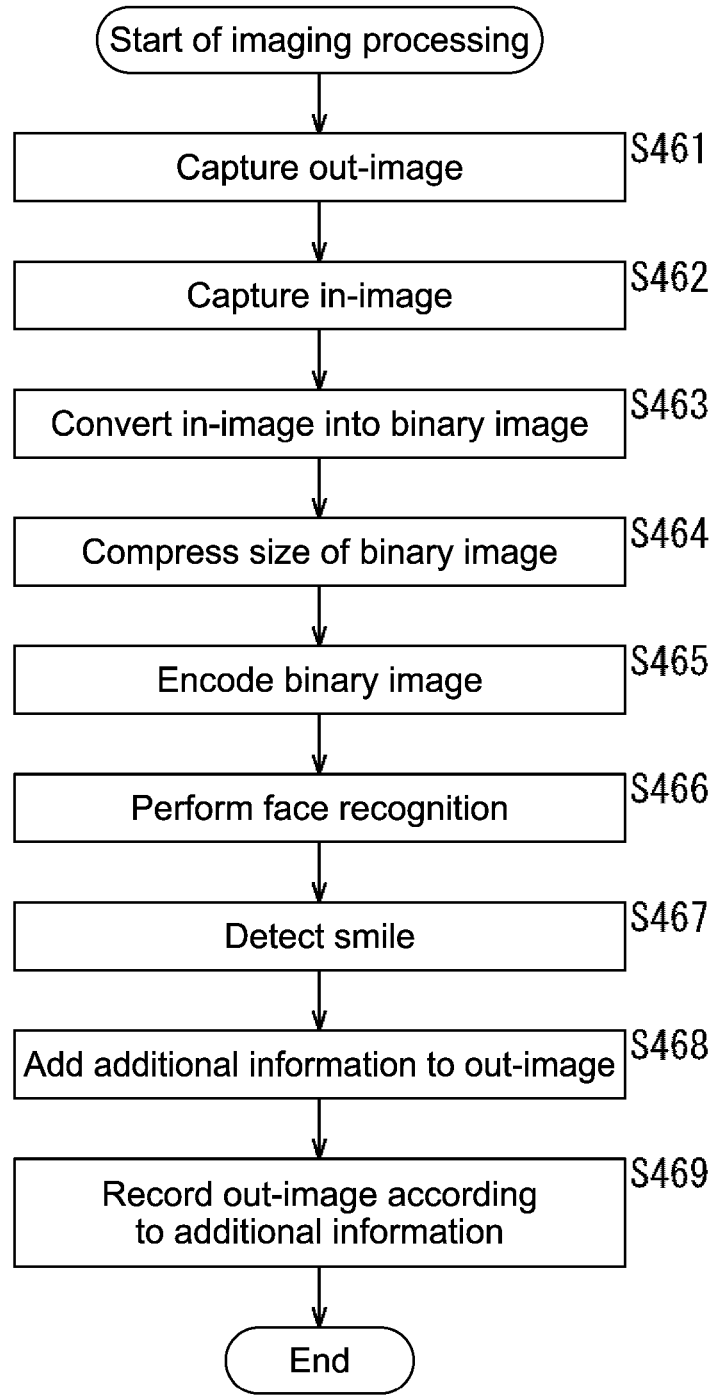
FIG. 32 is a flowchart for describing imaging processing.

Next, with reference to a flowchart of FIG. 32, description will be given on imaging processing performed by the image processing apparatus 11 when an out-image and an in-image are captured according to a user's instruction and the out-image is recorded according to the degree of smile.

Figure 23:
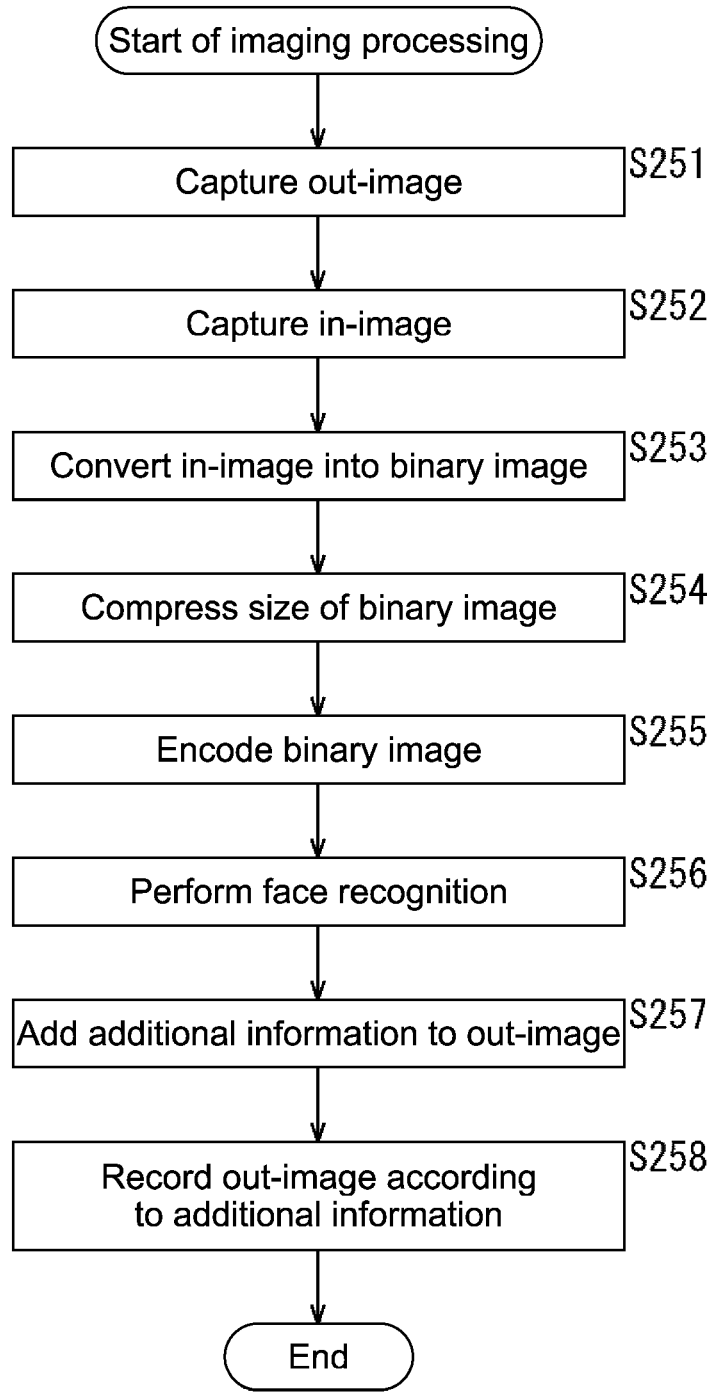
FIG. 23 is a flowchart for describing imaging processing.

Since processing of Steps S461 to S466 are similar to the processing of Steps S251 to S256 of FIG. 23, description thereof will be omitted. In other words, in those processing, an out-image and an in-image are captured according to a user's instruction, and an encoded binary image and photographer information are generated as additional information of the out-image.

In Step S467, the smile detecting unit 241 detects a smile of a user from the in-image supplied from the in-image capturing unit 22, and supplies the degree of smile of the user on the in-image thus obtained, as additional information, to the additional processing unit 82. For example, in Step S467, the processing similar to Step S312 of FIG. 26 is performed.

In Step S468, the additional processing unit 82 obtains, as additional information, photographer information from the face recognition unit 121, an encoded binary image from the compression unit 81, and the degree of smile from the smile detecting unit 241, and adds the additional information to the image data of the out-image from the out-image capturing unit 23. The additional processing unit 82 then supplies the image data of the out-image, to which the additional information is added, to the classification unit 271.

In Step S469, the classification unit 271 records the out-image in the recording unit 54 according to the additional information of the out-image supplied from the additional processing unit 82, and the imaging processing is terminated.

Specifically, the classification unit 271 identifies a folder with which the same degree of smile as the degree of smile added to the out-image is associated. The classification unit 271 then supplies the out-image to the recording unit 54 so as to be stored in the folder and recorded therein. In other words, in Step S469, the processing similar to Step S391 of FIG. 30 is performed.

As described above, the image processing apparatus 11 adds the binary image, the photographer information, and the degree of smile, which are obtained as additional information from the in-image, to the out-image, and records the out-image in the folder determined by the degree of smile.

Consequently, it is possible to more effectively display the out-image and also improve convenience. For example, if the degree of smile generated as additional information is used, it is possible to effectively display the out-image, for example, to display the out-image captured in a specific facial expression. In addition, since the out-images are recorded in folders on a photographer's facial expressions basis according to the degree of smile at the time when the out-images are recorded, the out-images of a specific degree of smile can be quickly identified.

Additionally, when the out-image is recorded in the recording unit 54, in the image processing apparatus 11, an out-image captured in a specific facial expression is displayed according to the operation to the operation input unit 51 by the user. In such a case, in the image processing apparatus 11, the reproduction processing described with reference to FIG. 31 is performed. In other words, an out-image stored in a folder with the degree of smile specified by the user is displayed.

The above-described series of processing may be performed by hardware or may be performed by software. In the case where the series of processing is performed by software, a program of the software is installed in a computer. Here, examples of the computer include a computer incorporated in dedicated hardware or a general-purpose personal computer capable of executing various functions by installing various programs.

Figure 33:
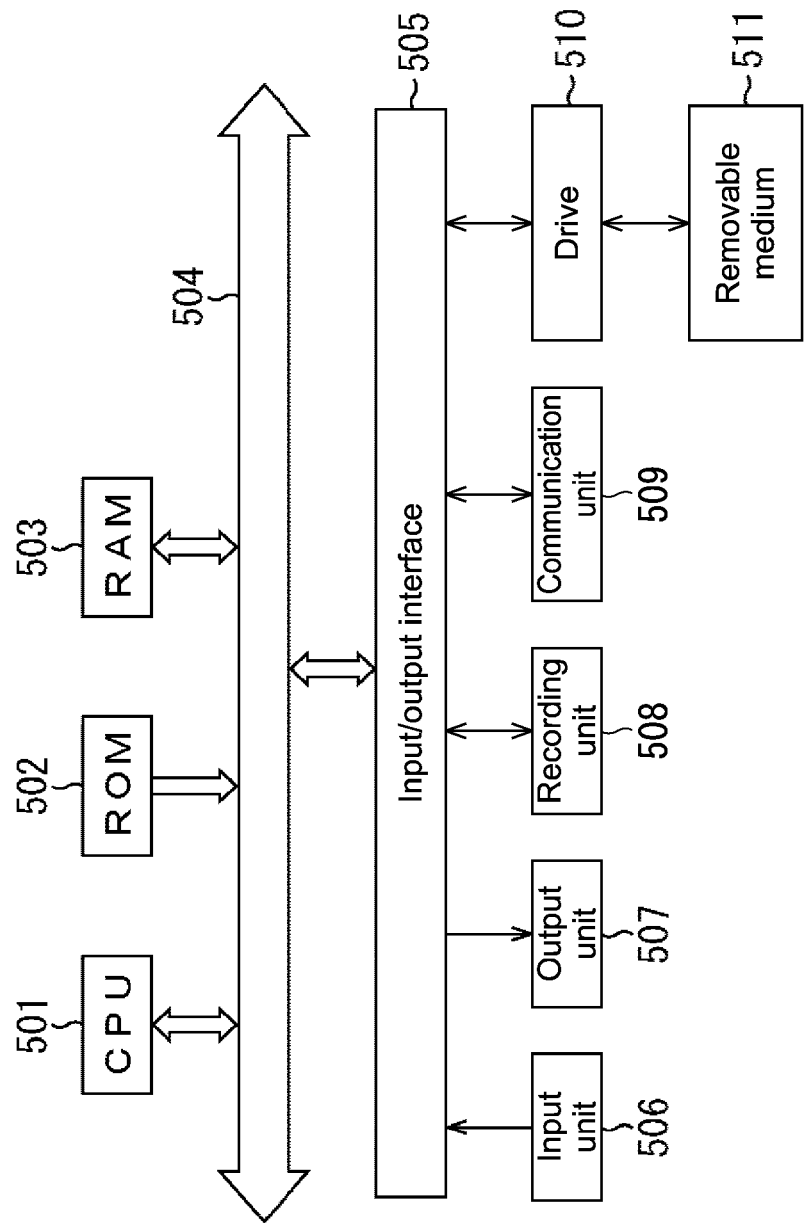
FIG. 33 is a diagram showing a configuration example of a computer.

FIG. 33 is a block diagram showing a configuration example of hardware of a computer executing the above-described series of processing by a program.

In the computer, a central processing unit (CPU) 501, a read-only memory (ROM) 502, and a random access memory (RAM) 503 are connected to one another by a bus 504.

Further, an input/output interface 505 is connected to the bus 504. An input unit 506, an output unit 507, a recording unit 508, a communication unit 509, and a drive 510 are connected to the input/output interface 505.

The input unit 506 is configured by a keyboard, a mouse, a microphone, an imaging element, or the like. The output unit 507 is configured by a display, a speaker, or the like. The recording unit 508 is configured by a hard disk, a non-volatile memory, or the like. The communication unit 509 is configured by a network interface or the like. The drive 510 drives a removable medium 511 such as a magnetic disc, an optical disc, a magneto-optical disc, or a semiconductor memory.

In the computer having the above-described configuration, the CPU 501 performs the above-described series of processing by loading, for example, the program recorded on the recording unit 508 to the RAM 503 via the input/output interface 505 and the bus 504 and executing the program.

For example, the program executed by the computer (the CPU 501) can be recorded on the removable medium 511 as a package medium or the like, and shared. The program can be provided via a wired or wireless transmission medium such as a local area network, the Internet, or digital satellite broadcast.

In the computer, the program can be installed on the recording unit 508 via the input/output interface 505 by mounting the removable medium 511 on the drive 510. The program can be received by the communication unit 509 via a wired or wireless transmission medium and can be installed on the recording unit 508. In addition thereto, the program can be installed in advance in the ROM 502 or the recording unit 508.

The program executed by the computer may be a program processed chronologically in an order described in this specification or may be a program processed in parallel or at a necessary timing such as a called time.

Embodiments of the present technology are not limited to the above-described embodiments, but may be modified in various ways within the scope of the present technology without departing from the gist of the present technology.

For example, the present technology may have a configuration of a cloud computing configuration in which one function is distributed and processed collectively by a plurality of devices via a network.

Additionally, the respective steps described in the above-described flowcharts may be executed by one device and may be also distributed and executed by a plurality of devices.

Further, when a plurality of processing are included in one step, the plurality of processing included in the one step may be executed by one device or may be distributed and executed by a plurality of devices.

Furthermore, the present technology may be configured as follows.

[1] An image processing apparatus, including:
a first imaging unit that images a first direction;
a second imaging unit that images a second direction, the second direction being different from the first direction;
an additional-information generating unit that generates additional information based on a first image, the first image being obtained in imaging by the first imaging unit; and
an additional processing unit that adds the additional information to image data of a second image, the second image being obtained in imaging by the second imaging unit.

[2] The image processing apparatus according to [1], in which
the additional-information generating unit compresses an information amount of the first image, to generate the additional information.

[3] The image processing apparatus according to [1] or [2], in which
the additional-information generating unit compresses the size of the first image, to generate the additional information.

[4] The image processing apparatus according to any one of [1] to [3], in which
the first imaging unit images a direction of a user operating the image processing apparatus, the direction serving as the first direction, and
the image processing apparatus further includes a combining unit that combines an image obtained from the additional information with the second image.

[5] The image processing apparatus according to [1], in which
the first imaging unit images a direction of a user operating the image processing apparatus, the direction serving as the first direction, and
the additional-information generating unit performs face recognition processing on the first image, to generate photographer information of the second image as the additional information.

[6] The image processing apparatus according to [5], further including:
an extraction unit that detects a second image from the plurality of second images based on the additional information, the second image being captured by a specific photographer; and
a reproduction unit that displays only the second image detected by the extraction unit.

[7] The image processing apparatus according to [5], further including a classification unit that records the second image in a recording area determined by the photographer information, the photographer information serving as the additional information.

[8] The image processing apparatus according to [1], further including a display unit that is provided to a surface facing a user operating the image processing apparatus, the first imaging unit being provided to the surface, and displays an image taken in by the second imaging unit at a time when the second image is captured, in which the additional-information generating unit detects a line-of-sight direction of the user based on the first image, to generate information indicating a gaze area at which the user gazes on the second image, the information serving as the additional information.

[9] The image processing apparatus according to [8], further including a reproduction unit that controls display of the second image based on the additional information.

[10] The image processing apparatus according to [9], in which
the reproduction unit superimposes and displays the plurality of second images based on the additional information.

[11] The image processing apparatus according to [1], further including a viewing-angle converting unit that performs viewing-angle conversion processing on the second image, in which
the additional-information generating unit obtains, as the additional information, a cropped image obtained by cutting out an area including a main subject on the first image, and
the additional processing unit adds the additional information to the image data of the second image on which the viewing-angle conversion processing is performed.

[12] The image processing apparatus according to [11], further including a combining unit that arranges and combines the cropped image serving as the additional information with the second image on which the viewing-angle conversion processing is performed, to generate a composite image with an aspect ratio that is the same as an aspect ratio of the second image captured by the second imaging unit.

[13] The image processing apparatus according to [1], in which
the first imaging unit images a direction of a user operating the image processing apparatus, the direction serving as the first direction,
the additional-information generating unit detects a smile of the user based on the first image and generates the degree of smile of the user as the additional information, and
the second imaging unit images the second direction when the smile of the user is detected.

[14] The image processing apparatus according to [13], further including a classification unit that records the second image in a recording area determined by the degree of smile, the degree of smile serving as the additional information.

[15] The image processing apparatus according to [1], in which
the first imaging unit images a direction of a user operating the image processing apparatus, the direction serving as the first direction,
the additional-information generating unit detects a smile of the user based on the first image and generates the degree of smile of the user as the additional information, and
the image processing apparatus further includes a classification unit that records the second image in a recording area determined by the degree of smile, the degree of smile serving as the additional information.

DESCRIPTION OF REFERENCE NUMERALS 11 image processing apparatus
21 display unit
22 in-image capturing unit
23 out-image capturing unit
53 signal processing unit
81 compression unit
82 additional processing unit
84 decoding unit
85 reproduction unit 121 face recognition unit
151 gaze-area detecting unit
181 viewing-angle converting unit
182 main-area detecting unit
183 crop processing unit

The invention claimed is:

1. An image processing apparatus, comprising:
a first imaging unit that is configured to image a first direction to obtain a first image;
a second imaging unit that is configured to image a second direction to obtain a second image, the second direction being different from the first direction;
an additional-information generating unit that is configured to generate additional information based on the first image to obtain a third image;
a combining unit that is configured to combine the third image with the second image to obtain a fourth image, the fourth image having an aspect ratio that is the same as an aspect ratio of the second image; and
a viewing-angle converting unit that is configured to perform viewing-angle conversion processing on the second image,
wherein, to generate the additional information based on the first image, the additional-information generating unit is further configured to crop the first image by cutting out an area including a main subject on the first image, and
wherein the combining unit is configured to combine the third image with the second image on which the viewing-angle conversion processing is performed.

2. The image processing apparatus according to claim 1, wherein, to generate the additional information based on the first image, the additional-information generating unit is further configured to compress an information amount of the first image.

3. The image processing apparatus according to claim 2, wherein, to the generate the additional information based on the first image, the additional-information generating unit is further configured to compress a size of the first image.

4. The image processing apparatus according to claim 3, wherein, to image the first direction to obtain the first image, the first imaging unit is configured to image a direction of a user operating the image processing apparatus.

5. The image processing apparatus according to claim 1, wherein, to image the first direction to obtain the first image, the first imaging unit is further configured to image a direction of a user operating the image processing apparatus, and
wherein, to generate the additional information based on the first image, the additional-information generating unit is further configured to perform face recognition processing on the first image to generate photographer information of the second image as the additional information.

6. The image processing apparatus according to claim 5, further comprising:
an extraction unit that is configured to detect a specific image from a plurality of second images based on the additional information, the specific image being captured by a specific photographer; and
a reproduction unit that is configured to display only the specific image that is detected by the extraction unit.

7. The image processing apparatus according to claim 5, further comprising a classification unit that is configured to record the second image in a recording area determined by the photographer information.

8. The image processing apparatus according to claim 1, further comprising a display unit that is provided to a surface facing a user operating the image processing apparatus, the first imaging unit being provided to the surface,
wherein the display unit is configured to display an image taken in by the second imaging unit at a time when the second image is captured,
wherein the additional-information generating unit is further configured to detect a line-of-sight direction of the user based on the first image, and
wherein, to generate the additional information based on the first image, the additional-information generating unit is further configured to generate gaze information from the first image, the gaze information being indicative of a gaze area at which the user gazes on the second image.

9. The image processing apparatus according to claim 8, further comprising a reproduction unit that is configured to control the display unit to display the second image based on the additional information.

10. The image processing apparatus according to claim 9, wherein
the reproduction unit is further configured to superimpose and display a plurality of second images based on the additional information.

11. The image processing apparatus according to claim 1, wherein, to combine the third image with the second image to obtain the fourth image, the combining unit is further configured to
arrange and combine the third image with the second image on which the viewing-angle conversion processing is performed, and
generate a composite image as the fourth image.

12. The image processing apparatus according to claim 1, wherein, to image the first direction to obtain the first image, the first imaging unit is further configured to image a direction of a user operating the image processing apparatus,
wherein, to generate the additional information based on the first image, the additional-information generating unit is further configured to
detect a smile of the user based on the first image, and
generate a degree of smile of the user as the additional information, and
wherein, to image the second direction to obtain the second image, the second imaging unit is further configured to image the second direction when the smile of the user is detected by the additional-information generating unit.

13. The image processing apparatus according to claim 12, further comprising a classification unit that is configured to record the second image in a recording area determined by the degree of smile.

14. The image processing apparatus according to claim 1, further comprising:
a classification unit configured to record the second image in a recording area determined by a degree of smile of a user operating the image processing apparatus,
wherein, to image the first direction to obtain the first image, the first imaging unit is configured to image a direction of the user,
wherein, to generate the additional information based on the first image, the additional-information generating unit is further configured to
detect a smile of the user based on the first image, and
generate the degree of smile of the user as the additional information.

15. An image processing method, comprising:
imaging, by a first imaging unit, a first direction to obtain a first image;
imaging, by a second imaging unit, a second direction to obtain a second image, the second direction being different from the first direction;
generating additional information based on the first image to obtain a third image;
combining the third image with the second image to obtain a fourth image, the fourth image having an aspect ratio that is the same as an aspect ratio of the second image; and
performing, by a viewing-angle converting unit, a viewing-angle conversion process on the second image,
wherein generating the additional information based on the first image to obtain the third image further includes cropping the first image by cutting out an area including a main subject on the first image, and
wherein combining the third image with the second image further includes combining the third image with the second image on which the viewing-angle conversion process is performed.

16. The image processing method according to claim 15, wherein combining the third image with the second image to obtain the fourth image further includes arranging and combining the third image with the second image on which the viewing-angle conversion process is performed, and generating a composite image as the fourth image.

17. A non-transitory computer-readable medium comprising a program that, when executed by a processing unit, causes the processing unit to perform a set of operations, the set of operations comprising:

imaging, with a first imaging unit, a first direction to obtain a first image;
imaging, with a second imaging unit, a second direction to obtain a second image, the second direction being different from the first direction;
generating additional information based on the first image to obtain a third image; and
combining the third image with the second image to obtain a fourth image, the fourth image having an aspect ratio that is the same as an aspect ratio of the second image, wherein the set of operations further includes performing, by a viewing-angle converting unit, a viewing-angle conversion process on the second image,
wherein generating the additional information based on the first image to obtain the third image further includes cropping the first image by cutting out an area including a main subject on the first image, and
wherein combining the third image with the second image further includes combining the third image with the second image on which the viewing-angle conversion process is performed.

18. The non-transitory computer-readable medium according to claim 17, wherein combining the third image with the second image to obtain the fourth image further includes arranging and combining the third image with the second image on which the viewing-angle conversion process is performed, and generating a composite image as the fourth image.

* * * * *